US012783917B2

(12) United States Patent
Vashist et al.

(10) Patent No.: US 12,783,917 B2
(45) Date of Patent: Nov. 3, 2026

(54) SCALABLE KNOWLEDGE DATABASE GENERATION AND TRANSACTIONS PROCESSING

(71) Applicant: Otsuka Pharmaceutical Development & Commercialization, Inc., Rockville, MD (US)

(72) Inventors: Akshay Vashist, Princeton, NJ (US); Chumki Basu, Basking Ridge, NJ (US); Todd Huster, Basking Ridge, NJ (US); Pingji Lin, Basking Ridge, NJ (US); Dennis Mok, Basking Ridge, NJ (US); John R. Wullert, II, Basking Ridge, NJ (US)

(73) Assignee: OTSUKA PHARMACEUTICAL DEVELOPMENT & COMMERCIALIZATION, INC., Rockville, MD (US)

( * ) Notice: Subject to any disclaimer, the term of this patent is extended or adjusted under 35 U.S.C. 154(b) by 1190 days.

(21) Appl. No.: 17/590,143

(22) Filed: Feb. 1, 2022

(65) Prior Publication Data

US 2022/0253729 A1 Aug. 11, 2022

Related U.S. Application Data

(60) Provisional application No. 63/144,466, filed on Feb. 1, 2021.

(51) Int. Cl.
*G06N 5/04* (2023.01)
*G06F 40/284* (2020.01)
(Continued)

(52) U.S. Cl.
CPC ............ *G06N 5/04* (2013.01); *G06F 40/284* (2020.01); *G06F 40/40* (2020.01); *G06N 5/022* (2013.01)

(58) Field of Classification Search
CPC .......... G06N 5/04; G06N 5/022; G06N 20/00; G06F 40/284; G06F 40/40; G06F 40/20; G06F 40/279; G06F 40/30
See application file for complete search history.

(56) References Cited

U.S. PATENT DOCUMENTS

| | | | | |
|---|---|---|---|---|
| 9,535,902 | B1 * | 1/2017 | Michalak | G06F 16/3331 |
| 10,235,336 | B1 * | 3/2019 | Bir | G06F 16/24578 |

(Continued)

OTHER PUBLICATIONS

Miñarro-Giménez, Jose A. et al., "Knowledge Extraction from MEDLINE by Combining Clustering with Natural Language Processing", Annual Symposium Proceedings, AMIA Symposium, Nov. 2015, pp. 915-924.

(Continued)

*Primary Examiner* — Mariela Reyes
*Assistant Examiner* — Evel Honore
(74) *Attorney, Agent, or Firm* — Pillsbury Winthrop Shaw Pittman LLP

(57) ABSTRACT

Systems and methods are described for a scalable approach to build a knowledge database of clinical trial data by extracting, aligning, and synthesizing information from a variety of sources including clinical trial registries, abstracts of papers, and full-text medical journal articles, as well as external gazetteers, dictionaries, and lexicons. For examples, a system may implement a flexible and repeatable workflow that extracts both structured and semi-structured elements from unstructured data such as journal articles using a 'back off strategy' in which specialized rules are used to extract structured, clinical trial design parameters as well as information retrieval techniques that exploit regularities in language used in the medical literature to discover semi-structured trial outcomes. This workflow also aligned structured elements with data from structured data sources and augmented the base structured information with addi- (Continued)

tional searchable trial features or characteristics and sentiment or polarity scores derived from the unstructured data.

20 Claims, 11 Drawing Sheets

(51) Int. Cl.
*G06F 40/40* (2020.01)
*G06N 5/022* (2023.01)

(56) References Cited

U.S. PATENT DOCUMENTS

| | | | | |
|---|---|---|---|---|
| 10,388,274 | B1 * | 8/2019 | Hoffmeister | G06N 3/047 |
| 10,878,505 | B1 * | 12/2020 | Blair | G06V 10/82 |
| 11,068,758 | B1 * | 7/2021 | Liachenko | G06F 18/2178 |
| 11,087,882 | B1 * | 8/2021 | Perlin | H04L 67/564 |
| 11,216,895 | B1 * | 1/2022 | Schwartz | G06F 16/248 |
| 11,232,266 | B1 * | 1/2022 | Biswas | G06F 40/35 |
| 11,687,723 | B2 * | 6/2023 | Nagesh | G06F 40/216<br>704/9 |
| 11,842,313 | B1 * | 12/2023 | Ingraham | G06F 40/205 |
| 2012/0259617 | A1 * | 10/2012 | Indukuri | G06F 40/279<br>704/9 |
| 2013/0268534 | A1 * | 10/2013 | Mathew | G06F 16/35<br>707/740 |
| 2017/0242907 | A1 * | 8/2017 | Goris | G06F 16/334 |
| 2017/0372696 | A1 * | 12/2017 | Lee | G10L 15/063 |
| 2019/0303441 | A1 * | 10/2019 | Bacarella | G06F 40/237 |
| 2021/0081972 | A1 * | 3/2021 | Sahni | G06N 20/00 |
| 2021/0182709 | A1 * | 6/2021 | Manchanda | G06N 5/022 |
| 2022/0148048 | A1 * | 5/2022 | Kumar Singh | G06F 16/24578 |

OTHER PUBLICATIONS

Kiritchenko, Svetlana et al., “ExaCT: automatic extraction of clinical trial characteristics from journal publications”, BMC Medical Informatics and Decision Making, 2010, pp. 1-17. http://www.biomedcentral.com/1472-6947/10/56.

Savova, Guergana K. et al., “Mayo clinical Text Analysis and Knowledge Extraction System (cTAKES): architecture, component evaluation and applications”, J Am Med Inform Assoc, 2010, pp. 507-513.

Andrei, Victor et al, “Identification of Promising Research Directions using Machine Learning Aided Medical Literature Analysis”, May 16, 2016, pp. 1-5. https://www.researchgate.net/publication/305401465.

Welcome to Medical Subject Headings, n.d. https://www.nlm.nih.gov/mesh/meshhome.html.

Jurafsky, Daniel et al., “Speech and Language Processing, An Introduction to Natural Language Processing, Computational Linguistics, and Speech Recognition”, Pearson Prentice Hall, Second Edition, Feb. 2008, pp. 1-16. https://www.researchgate.net/publication/200111340.

Wang, Yanshan et al., “Clinical Information Extraction Applications: A Literature Review”, Journal of Biomedical Informatics, 77 (2018) 34-49, pp. 34-49. https://www.researchgate.net/publication/321198377.

Vasiljeva, Ieva et al., “Automatic Knowledge Extraction from EHRs”, University of St Andrews, United Kingdom, n.d., pp. 1-6.

Stamatatos, Efstathios, “A Survey of Modern Authorship Attribution Methods”, Dept. of Information and Communication Systems Eng., University of the Aegean, Greece, n.d., pp. 1-28.

Keselj, Vlado et al., “N-Gram-Based Author Profiles for Authorship Attribution”, Pacific Association for Computational Linguistics, 2003, pp. 1-10.

Salton, Gerard et al., “Introduction to Modern Information Retrieval”, McGraw-Hill Book Company, Chapter 6, n.d., pp. 201-215.

Deng, Yihan et al., “Retrieving Attitudes: Sentiment Analysis from Clinical Narratives”, MedIR, Jul. 11, 2014, Gold Coast, Australia, pp. 12-15.

Niu, Yun et al., “Analysis of Polarity Information in Medical Text”, Annual Symposium proceedings, AMIA Symposium, Feb. 2005, pp. 570-574. https://www.researchgate.net/publication/7004844.

Sarker, Abeed et al., “Outcome Polarity Identification of Medical Papers”, Proceedings of Australasian Language Technology Association Workshop, 2011, pp. 105-114.

Stone, Philip J. et al., “The General Inquirer: A Computer Approach to Content Analysis”, The M.T.T. Press, Massachusetts Institute of Technology, Cambridge, Massachusetts, and London, England, 1966, pp. 1-680.

Tasneem, Asba et al., “The Database for Aggregate Analysis of ClinicalTrials.gov (AACT) and Subsequent Regrouping by Clinical Specialty”, PLoS ONE, Mar. 2012, vol. 7, Issue 3, pp. 1-12.

Krauth, Christian et al., “Clinical Trial Information Mediator”, Journal of Biomedical Informatics, 63, 2016, pp. 157-168.

Baeza-Yates, Ricardo et al., “Modern Information Retrieval”, Jul. 1999, pp. 1-39. https://www.researchgate.net/publication/2352627.

Deerwester, Scott et al., “Indexing by Latent Semantic Analysis”, n.d., pp. 1-34.

Dumais, Susan T., “Latent Semantic Indexing (LSI): TREC-3 Report”, n.d., pp. 1-12.

Baccianella, Stefano et al., “SENTIWORDNET 3.0: An Enhanced Lexical Resource for Sentiment Analysis and Opinion Mining”, Jan. 2010, pp. 2200-2204. https://www.researchgate.net/publication/220746537.

Jurafsky, Daniel et al., “Speech and Language Processing, An Introduction to Natural Language Processing, Computational Linguistics, and Speech Recognition”, Third Edition, 2020, pp. 1-615.

* cited by examiner

200

| Document ID | Document Type | Document Category | Receipt Date | Data Source |
|---|---|---|---|---|
| Doc_0 | Unstructured Data | Category_0 | T_1 | Source_0 |
| Doc_1 | Unstructured Data | Category_1 | T_2 | Source_1 |
| Doc_2 | Structured Data | Category_2 | T_3 | Source_2 |
| . . . . | . . . . | . . . . | . . . . | . . . . |
| Doc_N | Structured Data | Category_N | T_N | Source_N |

| Document ID | Polarity Metric | Strength Metric | Change Metric | Evidence |
|---|---|---|---|---|
| Doc_0 | Positive | Strong | None | {Tokens_0} |

| Document ID | Polarity Metric | Strength Metric | Change Metric | Evidence |
|---|---|---|---|---|
| Doc_1 | Negative | Weak | More | {Tokens_1} |

800

802

SCALABLE KNOWLEDGE DATABASE GENERATION AND TRANSACTIONS PROCESSING

CROSS-REFERENCE TO RELATED APPLICATIONS

This application claims priority under 35 U.S.C. § 119(e) to U.S. Provisional Patent Application No. 63/144,466, filed on Feb. 1, 2021, which is incorporated herein by reference in its entirety.

BACKGROUND

The amount of information available through various types of sources is staggering and growing each day, which can make efficient and thorough information retrieval challenging. Compounding this is the diverse ways in which information is stored and retrieved. For example, information may be stored as structured data or unstructured data. Structured data is data having predefined data fields with corresponding values. As such, structured data may provide an ability to specifically retrieve information so long as it is stored in one of the predefined data field fields. Unstructured data may include free-form data such as natural language text. Unstructured data may therefore include any type of information. Information retrieval is becoming increasingly computationally intensive and complex due to the types and scale of information to be stored and searched.

SUMMARY

The disclosure relates to systems and methods of generating and/or updating a knowledge database from structured and unstructured data sources. For example, a method may include aligning structured data with unstructured data that is processed through natural language processing models to generate an aggregate knowledge database. In particular, the method may include accessing a structured data record and a document having unstructured data, the structured data record having one or more data fields that describe a feature of a respective domain of interest in a predefined manner. The method may further include matching the structured data record and the document based on a common domain of interest and extracting features from the unstructured data based on a natural language processing (NLP) entity extraction model that tokenizes the unstructured data and uses domain-specific entity identification of the tokenized unstructured data. The method may further include augmenting the structured data record with the extracted features to build aggregate knowledge across structured and unstructured data for the domain of interest. The method may further include identifying sentences in the unstructured data that relate to a target aspect of the domain of interest based on an NLP similarity recognition model that compares similarity between sentences using a cosine similarity in a vector space, wherein the similarity is based on regularities in language used for the target aspect and uses the regularities to predict that an input sentence is similar to a sentence previously known to relate to the target aspect and a ranking of sentence similarity using latent semantic indexing. The method may further include classifying the identified sentences into a sentiment classification based on an NLP sentiment analysis model, the sentiment classification including a polarity score and a strength score, and generating a data structure in the knowledge database that corresponds to the sentence, the data structure having fields structuring data that represents (a) the target aspect in the domain of interest, (b) derived evidence measures that include (i) the polarity score, (ii) the strength score, and (c) some or all of the structured data or augmented structured data.

DETAILED DESCRIPTION

Figure 1:
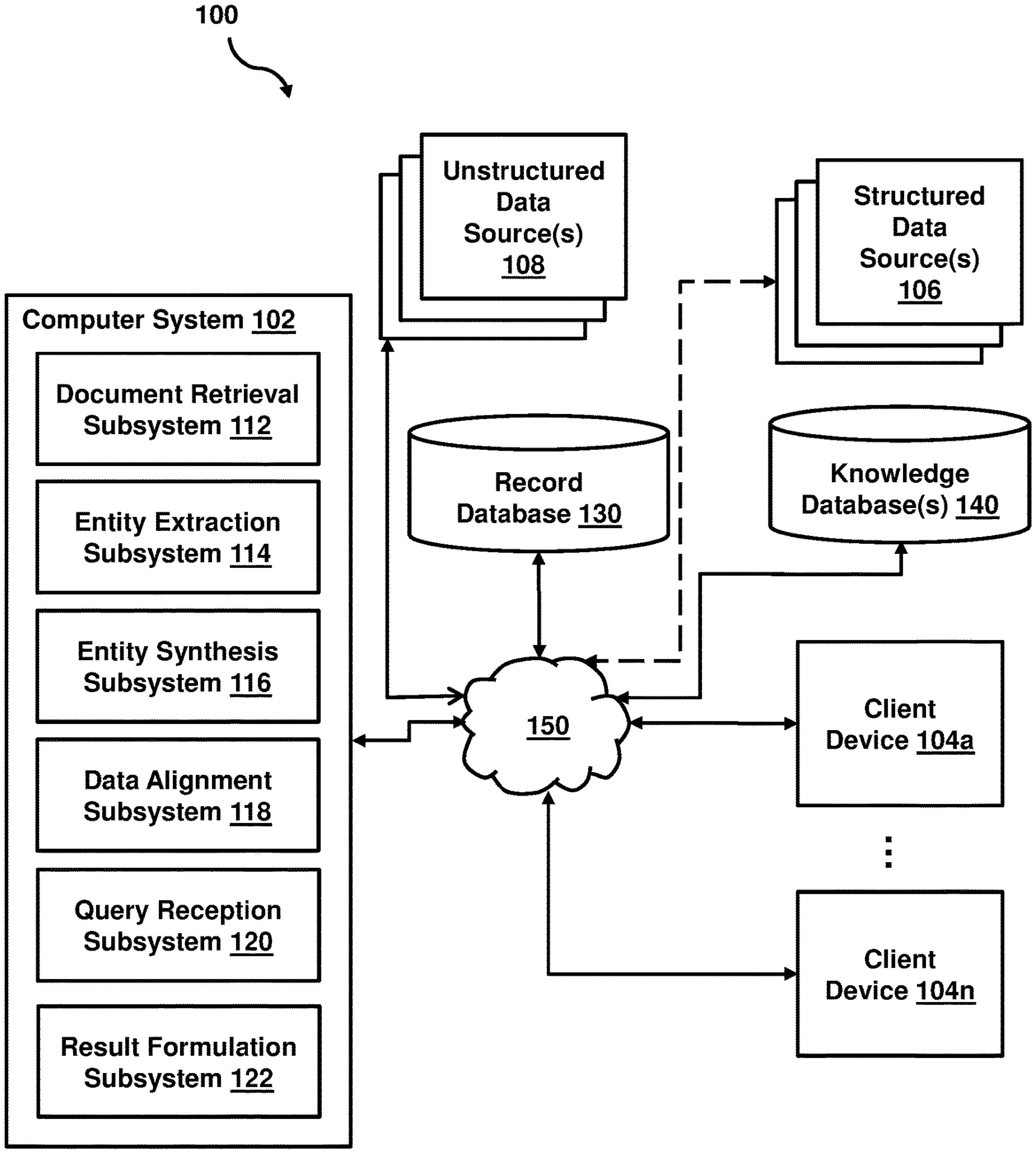
FIG. 1 is a diagram of an example of a system for aligning structured data with unstructured data that is processed through natural language processing models to generate an aggregate knowledge database, and facilitating search queries with the aggregate knowledge database, in accordance with various embodiments.

The disclosure relates to systems and methods of generating a knowledge database in which information is extracted, aligned, and synthesized from various sources using NLP models in a scalable manner. The sources may include structured data sources and/or unstructured data sources. While structured data can be searched with specificity, one problem is that the rigidity of the structured data may make information storage incomplete and inflexible. For example, the data fields may force information to be stored in predefined ways that can limit what may be stored and searched. Furthermore, some data fields may be incompletely filled or missing data altogether. On the other hand, while unstructured data by its nature allows any information to be presented, the free-form nature also makes it challenging to identify domain-specific information for information retrieval. Adding to these issues, information retrieval from structured and unstructured data sources may result in bifurcated information retrieval systems, with inefficiencies associated with each.

The systems and methods described herein may aggregate various sources of data relating to a specific domain of interest so that information retrieval may be performed using structured and/or unstructured data sources. In particular, a system may align structured data with unstructured data based on a domain of interest that is common to both. In this way, the system may collect, analyze and store both structured data and unstructured data for a specific domain of interest.

To generate a comprehensive knowledge database, the system may use NLP models to extract features from unstructured data. The extracted features may augment or replace any missing information in the structured data that was previously aligned with the unstructured data. Furthermore, the system may use NLP models to perform sentiment analysis to collect polarity and strength metrics, as well and change and strength metrics for aspects of the unstructured data that are extracted. The foregoing structured data, extracted features, results of sentiment analysis and evidence collection for various aspects may be aggregated and linked based on the common domain of interest. The aggregated and linked data may be represented as a data structure in the knowledge database, facilitating efficient and robust information retrieval using multiple search parameters across the structured data, extracted features, results of sentiment analysis and collected evidence.

To illustrate, examples of generating a knowledge database from structured data and unstructured data will be described in the context of clinical trials. However, it should be noted that the knowledge database may be generated and applied to other contexts that use structured and/or unstructured data sources as described herein. In these examples, a domain of interest may include a clinical trial, a feature may include a clinical trial design parameter, and an aspect may relate to an outcome (or result) of the clinical trial. A clinical trial involves scientific studies to, among other things, determine the efficacy and safety of a particular therapeutic to treat a health condition such as a disease or injury.

In the example context of a clinical trial, structured data sources may include clinical trial repositories. While clinical trial repositories enable field-specific searching, such as searching based on a clinical trial's design parameters, they may not provide complete coverage of the trial and rarely provide results of the trial. Unstructured data sources may include journal article repositories that may include academic style papers often written in dense prose. The journal articles may provide complete data, particularly with respect to a clinical trial's outcome, but the articles are typically only discoverable via free-text searches, and the targeted information about specific information such as clinical outcomes are difficult to obtain.

Described herein is a knowledge database and techniques for storing data to the knowledge database, deriving new knowledge from the stored data, and providing useful information to a requesting user. The knowledge database may provide full and expandable coverage of clinical trials with a structured representation of trial design information to facilitate convenient and controlled search of the knowledge database, and simplified access to detailed results or outcome information of a corresponding clinical trial.

In some embodiments, systems and methods described herein may use customized rule sets are applied to unstructured data to precisely identify trial characteristics. If pieces of information cannot be precisely identified with sufficiently low error, such as, for example, in cases where there is variability amongst trial result descriptions, statistical methods can be implemented to identify related matches. In some embodiments, the aforementioned approach is referred to as a "backoff" strategy in NLP. In the knowledge driven solution and knowledge database generation process described herein, the aforementioned backoff strategy may be adapted to use highly-precise extraction rules to find trial design characteristics and back off to using information retrieval matching techniques to locate descriptions of trial outcomes or results. As an example, one approach to the area of authorship attribution is to first construct a profile of an author's prior works as a representation of the author's style and then compare unknown text to the profile to determine how similar the two works are. One technique for measuring similarity is by computing a distance measure (for example, an L2 distance, a cosine distance, a Manhattan distance, etc.). The knowledge driven solution described herein adopts such an approach for clinical trial results and/or outcome detection with the belief that there will be regularities in the use of terminology when multiple authors discuss clinical trial findings. In particular, some embodiments include profiles of authors being represented as vectors of term frequency-inverse document frequency (TFIDF) weights or reduced dimensional vectors, as discussed below.

Similar to information extraction, knowledge can also be derived by detecting and analyzing sentiment in free-text (for example, text describing patient health status in clinical narratives, medical literature, etc.). In some embodiments, an aggregate analysis may be performed by assigning the following features associated with word usage and expression to the text of trial outcomes or results: polarity, strength, and change. Some cases use a predefined set of procedures for identifying, and deriving useful information therefrom, recurrent patterns within prose. For example, the sentiment analysis algorithm may perform content analysis using recurrent pattern detection procedures. In some embodiments, the predefined set of procedures may be adapted with one or more lexicons to account for how terms are used for a particular context. For example, a medical domain lexicon may provide meaning and context to certain words/phrases/expressions with respect to the medical domain.

In some embodiments, the knowledge driven solution may include performing a semantic analysis on text to extract sentiment features for use when performing text classification. As described herein, differing from existing knowledge synthesis techniques, the present applications describe techniques for using these semantic features to discover relationships in word usage and expression, and for retrieval and comparison of content (for example, documents detailing a clinical trial) by an end user.

In some embodiments, clinical trial data from a document describing a clinical trial, such as an outcome of the clinical trial, may be aggregated and analyzed. After being analyzed, an end user may, via their client device, search for and retrieve clinical trial data from a common knowledge database, as well as compare clinical trial data along multiple dimensions using a single interface. These functionalities are enabled by providing not only the trial characteristics already available from public repositories, but also extracting and aligning trial data from downloaded articles, analyzing the aligned data to derive results, and storing the results in a common (for example, accessible by multiple end-users) knowledge database. The knowledge database may also associate additional trial characteristics and features, such as results descriptions and authors' sentiments in describing those results, which can be inferred from these articles, with the clinical trial data. Thus, the present knowledge driven solution and knowledge database provides a unique system capable of returning sentiment, strength, and/or polarity scores as part of a clinical trial search interface, which is not yet afforded by existing search engines.

FIG. 1 is a diagram of a system for aligning structured data with unstructured data that is processed through natural language processing models to generate an aggregate knowledge database, and facilitating search queries with the aggregate knowledge database, in accordance with various embodiments. Unstructured data, as described herein, refers to information that is not stored in a predefined data model or organized using a predefined data structure. Unstructured data is primarily composed of prose such as natural language text, and may include dates, numbers, and/or other forms of data. An example of unstructured data is unstructured text in journal articles. Structured data, on the other hand, has a predefined format, which may be standardized across several sources (or which can be transformed into a standardized form). An example of structured data includes clinical trial data records that are stored in clinical trial repositories using named data fields that store clinical trial data.

In some embodiments, system 100 may include computer system 102, client devices 104*a*-104*n* (which are referred to interchangeably as "client device 104" or "client devices 104" unless specified otherwise), a structured data source 106, an unstructured data source 108, a document database 130, and a knowledge database 140. Computing system 102 and client device 104 may communicate with one another via network 150. Although a single instance of computing system 102 is represented within system 100, multiple instances of computing system 102 may be included, and the single instance of computing system 102 is to minimize obfuscation within FIG. 1. For example, system 100 may include multiple computer systems working together to perform operations associated with computer system 102.

Network 150 may be a communications network including one or more Internet Service Providers (ISPs). Each ISP may be operable to provide Internet services, telephonic services, and the like, to one or more client devices, such as client device 104. In some embodiments, network 150 may facilitate communications via one or more communication protocols, such as those mentioned above (for example, TCP/IP, HTTP, WebRTC, SIP, WAP, Wi-Fi (for example, 802.11 protocol), Bluetooth, radio frequency systems (for example, 900 MHz, 1.4 GHz, and 5.6 GHz communication systems), cellular networks (for example, GSM, AMPS, GPRS, CDMA, EV-DO, EDGE, 3GSM, DECT, IS 136/TDMA, iDen, LTE or any other suitable cellular network protocol), infrared, BitTorrent, FTP, RTP, RTSP, SSH, and/or VOIP.

Client device 104 may send requests (for example, queries for documents) and obtain results of the requests from computer system 102. Client device 104 may include one or more processors, memory, communications components, and/or additional components (for example, display interfaces, input devices, etc.). Client device 104 may include any type of mobile terminal, fixed terminal, or other device. By way of example, client device 104 may include a desktop computer, a notebook computer, a tablet computer, a smartphone, a wearable device, or other client device. Users may, for instance, utilize client device 104 to interact with one another, one or more servers, or other components of system 100. For example, computer system 102 may host a web-based interface for accessing documents stored in document database 130 and/or data stored in knowledge database 140, and an end user may submit, using client device 104, a query via the web-based interface for documents and/or data.

Computer system 102 may include one or more subsystems, such as document retrieval subsystem 112, entity extraction subsystem 114, entity synthesis subsystem 116, data alignment subsystem 118, query reception subsystem 120, result formulation subsystem 122, or other subsystems. Computer system 102 may include one or more processors, memory, and communications components for interacting with different aspects of system 100. In some embodiments, computer program instructions may be stored within memory, and upon execution of the computer program instructions by the processors, operations related to some or all of subsystems 112-122 may be executed by the computer system 102. In some embodiments, the subsystems 112-122 may be implemented in hardware, such as firmware. In some embodiments, document retrieval subsystem 112, entity extraction subsystem 114, entity synthesis subsystem 116, and data alignment subsystem 118 may be part of a document retrieval and processing system (or subsystem), and query reception subsystem 120 and result formulation subsystem 122 may be part of a real-time transaction processing system (or subsystem). In this manner, documents stored within document database 130 may be retrieved and processed, via the document retrieval and processing system, to obtain data structures of a standardized format, which can then be stored within knowledge database 140. End users seeking to obtain knowledge represented by the data stored by the data structures may do so by submitting requests to the real-time transaction processing system, which may extract some or all of the data of the data structure, generate a user interface for rendering the data, and provide the user interface and the data to the end user's device.

In some embodiments, the document retrieval subsystem 112 may identify and retrieve data records from structured data sources 106 and/or unstructured data sources 108. Structured data sources 106 may include data records that are structured into one or more named data fields. For example, structured data sources 106 may provide clinical trial data records that are stored in named data fields that relate to clinical trials. For example, a structured data source 106 may expressly store a field name "clinical trial identifier" that stores an identifier that uniquely identifies a particular clinical trial. Other named fields may include clinical trial design parameters, clinical trial results or outcomes, and/or other clinical trial data. As used herein, the term "data record" may be used interchangeably with "document" unless stated otherwise. Thus, a structured data record may also be referred to as a document having structured data. Unstructured data sources 108 may store documents having unstructured data such as natural language text and/or other content. For example, the documents in the unstructured data sources 108 may include scientific journal articles or abstracts written by scientists to share their findings with respect to a clinical trial. With vast numbers of journal articles and other unstructured content—and the challenges of retrieving relevant outcomes of clinical trials from natural language text, it may be difficult to aggregate journal articles or other unstructured documents with structured clinical trial data records to build a comprehensive knowledge database that includes both.

In some embodiments, when a new document (whether structured or unstructured) is added or retrieved by the document retrieval subsystem 112, or is to be added to, document database 130, a corresponding notification may be provided to computer system 102 to indicate that the new document is to be retrieved from document database 130.

In some embodiments, document database 130 may store documents including structured data (such as clinical trial results and/or outcomes) and documents including unstructured data (such as published scientific journal articles). As used herein, a "document" in the document database 130 may refer to one or more data records that store one or more data values from various data sources 106, such as structured data and/or unstructured data. Thus, document database 130 may store ingested data from one or more data sources 106, which may include structured and/or unstructured data sources.

Figure 2:
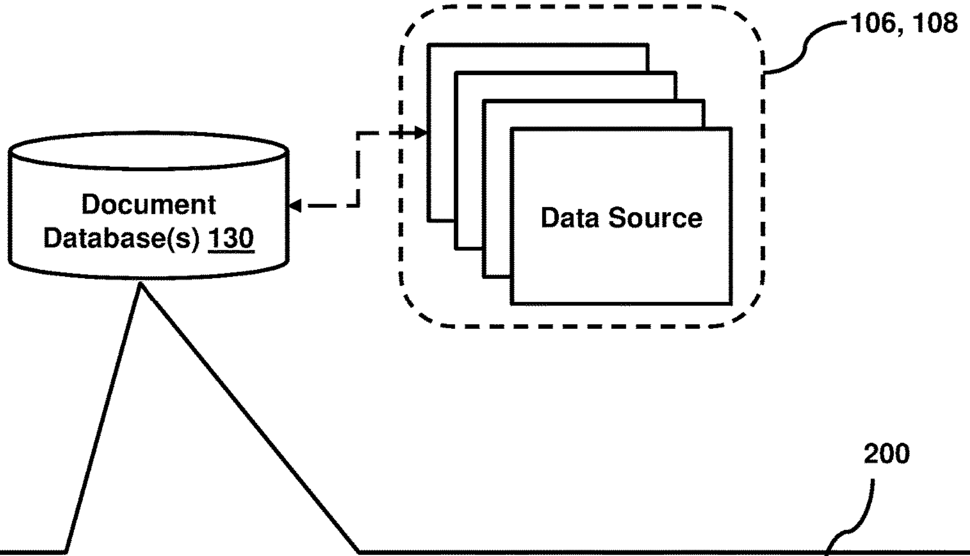
FIG. 2 is a diagram of a document database storing documents having structured data and unstructured data, in accordance with various embodiments.

Document database 130 may include a table storing information included by a given document when stored to document database 130. For example, with reference to FIG. 2, data table 200 may be used to organize the documents stored within document database 130. Table 200 may include columns of different metadata and features relating to each document stored within document database 130. Each entry in data table 200 corresponds to a different document (including structured or unstructured data). For example, if there are N documents stored in document database 130, then data table 200 may include N entries.

In some embodiments, the columns in data table 200 may include different information about the documents, such as, for example, a document identifier column, a document type column, a document category column, a receipt date column, a data source column, or other columns may also or alternatively be included. The document identifier column may store a document identifier for each document stored in document database 130. The document identifier may be a unique character string that is used to differentiate the documents from one another (for example, Doc_0, Doc_1, . . . , Doc_N). In some embodiments, the document identifier may include, or may be, a pointer to a location within document database 130 where the corresponding document is stored. For example, the document identifier may be an IP address where the document is accessible from (for example, for viewing, downloading, sharing, etc.). The document type column may indicate whether a corresponding document contains structured data or unstructured data (for example, a document type). The document type may be indicated by metadata included with the corresponding document, such as an indication of what type of document the document is (for example, whether document is a journal article, research results, published abstract, etc.). In some embodiments, the document type may be determined based on the data source (for example, structured data source 106 or unstructured data source 108) that the document was obtained from. Depending on the data source, the document type may be determined. The document category may be determined based on the content of the document, metadata associated with the document, or via other techniques. For example, the document category may be determined based on predefined codes specifying topics with which the document relates (for example, a particular drug therapy, a published article, etc.). In some embodiments, the document category column may be derived from an abstract or title of the document, derived from downstream NLP steps, or via other mechanisms. The receipt date column may indicate a date with which a corresponding document was provided to and stored within document database 130. Additionally, the data source column may include an indication of a particular data source (for example, structured data source 106 or unstructured data source 108) with which the corresponding document originated.

In some embodiments, knowledge database 140 may store data structures representing data extracted/derived from documents having unstructured text data, as well as data structures representing data extracted from documents having structured text data. Knowledge database 140 may be a flexible, scalable, and searchable database populated with structured and unstructured clinical trial information in a manner that supports advanced interactions.

In some embodiments, an information model generated to drive the creation of a unified knowledge database, which would be capable of representing data from a wide range of sources. This desire was tempered by the requirement to avoid generating a completely new model that would impose a tremendous learning curve on users and require complicated mappings from existing sources. The information model includes a plurality of entities, some which are shown, as examples, in Table 1.

Figure 3:
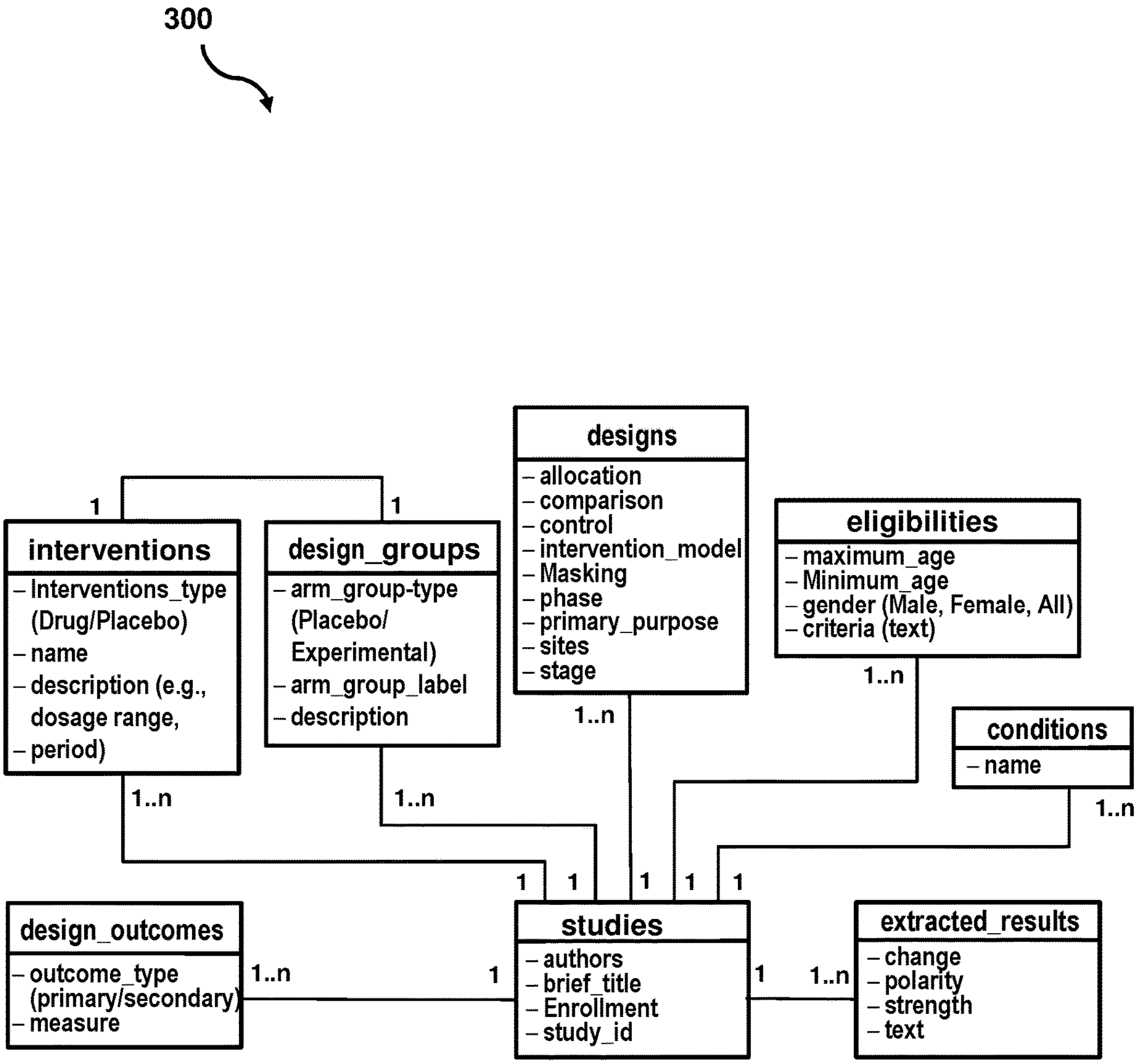
FIG. 3 is a diagram of the information model used for extraction of clinical trial data, in accordance with various embodiments.

As seen, for example, with reference to FIG. 3, information model 300 may include

TABLE 1

| Information Element | Description |
|---|---|
| Studies | Represents overall characteristics of the study and serves as central anchor in the model |
| Designs | Represents primary design attributes |
| Conditions | Represents names of the conditions being treated in the study |
| Eligibilities | Represents characteristics of patients who participated in the trials |
| Design_outcomes | Represents the primary and secondary efficacy measures used in the trial |
| Arm_design_groups | Represents the test arms used in the trial |
| Interventions | Represents treatments used in each of the arm_design_groups |
| Extracted_results | Represents the sentences and phrases that describe trial results |

primary entities studies, designs, conditions, eligibilities, design outcomes, interventions, design groups, and extracted results. Each of the primary entities may include one or more attributes. Computer system 102 may implement some or all of subsystems 112-122 to extract values for the attributes associated with each of the entities. In some cases, the entities/attributes may be stored in a data structure as slot-value pairs. A slot may represent a data field capable of being assigned a value, where a given entity may be referenced one or more times within an utterance.

Many of the attributes listed in information model 300 refer to common characteristics of clinical trials. However, differing from conventional clinical trial lexicography, information model 300 also includes entities referring to results or outcomes of a given trial. There is a wide variety of results and tremendous variability in how results are reported in the literature. For example, some existing databases implement a highly structured schema to represent design aspects of a trial, where the schema uses a freeform, tag-value format for results. Given this variability, information model 300 may identify results by capturing the sentences and phrases that describe them. The output of information model 300 may characterize trial outcomes by properties of word/term usage (and/or n-gram usage) and expressions, such as polarity, strength, and change, which are consequently available for search and comparison.

In some embodiments, entity extraction subsystem 114 may extract features from unstructured data. The features may include values associated with named entities and other knowledge from unstructured data. For example, the features may include metadata, clinical trial design parameters, and/or other data from the unstructured data (for example, published articles, abstracts, etc.). In some embodiments, entity extraction subsystem 114 may implement an information model, such as information model 300, to perform the entity/attribute/value extraction. Some embodiments include information model 300 used by NLP entity extraction models to perform feature extraction. Such NLP entity extraction models may include the General Architecture for Text Engineering (GATE), OpenNLP, or other entity recognition models.

Figure 4:
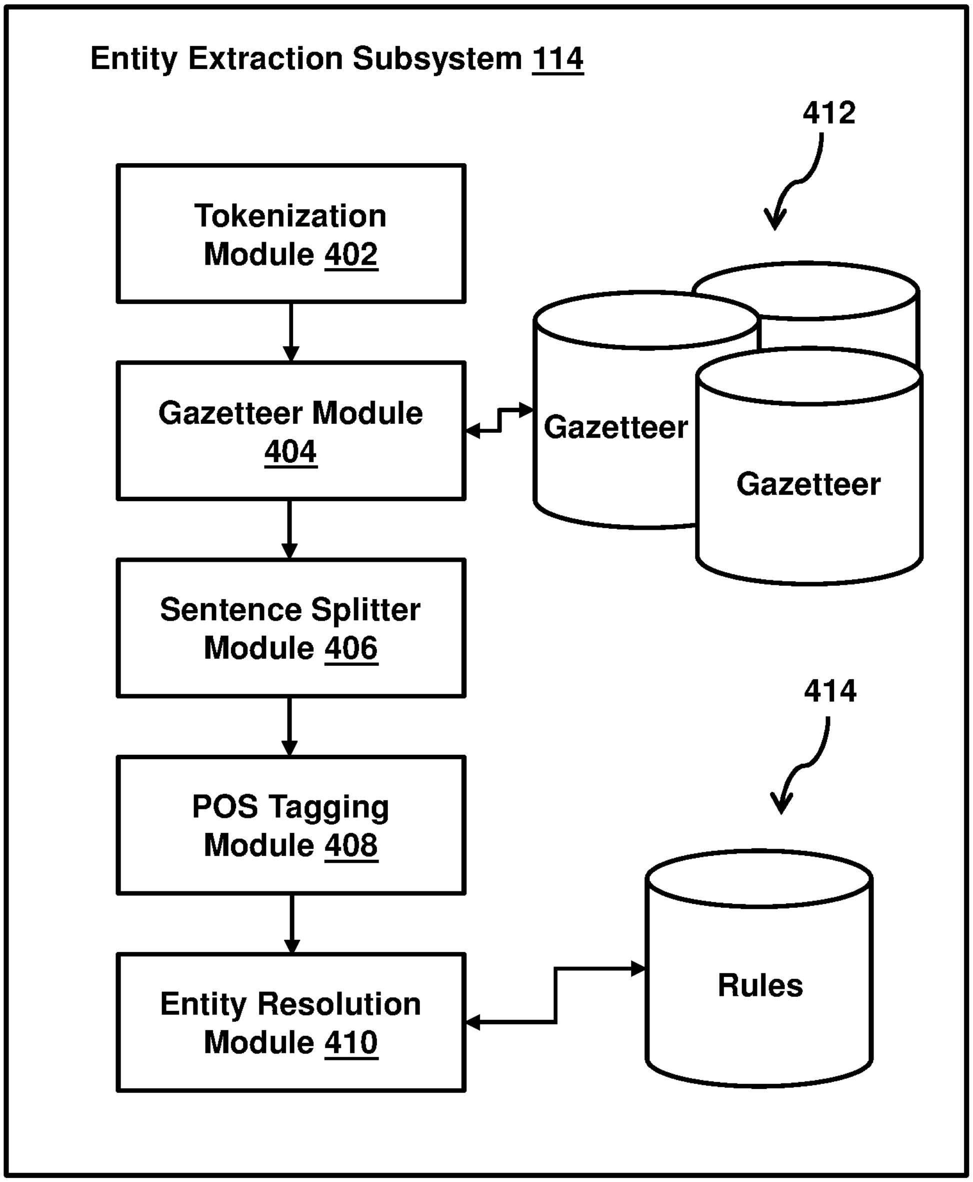
FIG. 4 is a diagram of an entity extraction subsystem used to extract entities and perform other natural language processing operations, in accordance with various embodiments.

As seen, for example, with reference to FIG. 4, entity extraction subsystem 114 may include various information extraction modules to form a knowledge extraction pipeline. For instance, entity extraction subsystem 114 may include a tokenization module 402, a gazetteer module 404, a sentence splitter module 406, a part-of-speech (POS) tagging module 408, an entity resolution module 410, or other modules. Entity extraction subsystem 114 may implement customized natural-language entity identification techniques to extract clinical trial design information from the (unstructured) text of published technical articles.

In some embodiments, tokenization module 402 may segment text into semantic chunks, representing words, numbers, punctuation, and/or other formatting characters. Tokenization module 402 may execute a process that converts a sequence of characters into a sequence of tokens, which may also be referred to as text tokens or lexical token. Each token may include a string of characters having a known meaning. The tokens may form an entity/value pair. The various different types of tokens may include identifiers, keywords, delimiters, operators, and/or other token types. For instance, for a given text string, such as a sentence (for example, including p terms) may be split into p tokens based on detection of delimiters (for example, a comma, space, etc.), and can assign characters forming each token (for example, "values") to each token. Tokenization module 402 may also perform parsing to segment text (for example, sequences of characters or values) into subsets of text. For example, the parsing may identify each word within a given sentence. Tokenization involves classifying strings of characters into text tokens. For example, a sentence structured as, "the car drives on the road," may be represented in XML as:

```
<sentence>
  <word> the </word>
  <word> car </word>
  <word> drives </word>
  <word> on </word>
  <word> the </word>
  <word> road </word>
</sentence>.
```

Gazetteer module 404 may access gazetteers 412, which stores lists of pre-defined words and phrases from capturing specific concepts. Some example gazetteers may include lists of person names, locations, and objects. In some embodiments, gazetteer 412 may include multiple gazetteers, each specifically crafted to include terms related to clinical trial knowledge extraction, as seen from Table 2.

TABLE 2

| Gazetteer | Description |
|---|---|
| Adverse Event Severity | List of phrases that describe the severity of an adverse reaction |
| Treatment Application | List of phrases that indicate a treatment being applied (for example, mild, severe) |
| Cancers, Diseases | Lists of diseases and conditions |
| Design Attributes | List of phrases that describe various trial design attributes, tagged by type (for example, double-blind, placebo-controlled) |
| Dosage Time | List of phrases describing frequency of administration of medicines (for example, once-daily, three times a week) |
| Dosage Units | List of measurements used for quantifying the amount of a medicine to administer (for example, milligrams, mg bid) |
| Efficacy | List of phrases the are indicators of the efficacy measures being used to assess the results of a trial (for example, endpoints, outcome) |
| Outcome Types | List of phrases that indicate and differentiate primary and secondary efficacy measures (for example, Main, primary, alternate, secondary) |
| Patient Types | Lists of words that capture various classes of subjects in a trial (for example, adolescents, adult males) |
| Pharmaceuticals | List of pharmaceutical medications (for example, albuterol, Potassium Gluconate) |

As seen from Table 2, each gazetteer may include its own list ofterms (for example, words, phrases, symbols, etc.) related to an overall theme of that gazetteer. For example, the gazetteer "Pharmaceuticals" may include a list or lists ofvarious pharmaceutical medications. As another example, the gazetteer "Dosage Units" may include a list or lists of various units with which therapeutics (e.g., medications) may be disseminated. As an example, as seen from Table 3 below, the "Dosage Units" gazetteer includes a list of labels, and the corresponding dosage units that those labels correspond. For instance, the label "mg" represents a unit of milligrams, the label "mg/d" represents a unit of milligrams per day, and the like. As another example, the gazetteer "Dosage Time" may include a list or lists of phrases describing a frequency with which certain medications are to be administered. Table 4, included below, includes an example of the "Dosage Time" gazetteer, which may include a list of labels and the corresponding temporal frequencies that those labels correspond. For instance, the label "Once-daily" represents a frequency of "once per day," indicating that an associated medication is to be administered to a patient one time each day.

Persons of ordinary skill in the art will recognize that the list described in Tables 3 and 4 are exemplary, and additional or alternative units/frequencies may be included.

TABLE 3

| Label | Unit Description |
|---|---|
| mg once-daily | milligrams per day |
| milligrams once-daily | milligrams per day |
| mg QD | milligrams per day |
| mg BD | milligrams twice per day |
| mg BID | milligrams twice per day |

TABLE 4

| Label | Frequency Description |
|---|---|
| Once-daily | Once per day |
| Twice-daily | Twice per day |
| in the morning | Morning |

TABLE 4-continued

| Label | Frequency Description |
|---|---|
| one time per week | Once per week |
| thrice per week | Three times per week |

Thus, entity extraction subsystem 114 may identify whether prose recites any of the listed pharmaceutical medications based on an analysis of the text tokens from a given document in comparison to tokens included in the "Pharmaceuticals" gazetteer, any of the listed dosage units included in the "Dosage Units" gazetteer, or any of the listed dosage frequencies included in the "Dosage Time" gazetteer. By adding these customized and subject matter-specific gazetteers to traditional gazetteers, entity extraction subsystem 114 is able to extract more intelligence from a document than conventional entity extraction systems. In addition, the gazetteers can be scaled to include new lists of terms to expand the entity identification capabilities of computer system 102. Still further, the gazetteers may be modified (for example, new terms can be added to an existing gazetteer, existing terms can be removed, etc.).

Sentence splitter module 406 may recognize sentence boundaries, with ability to differentiate punctuation used for other purposes (for example, decimal points, abbreviations). Sentence splitter module 406 may, in some embodiments, identify additional document structure indicators, such as paragraph, section, or other delimiters. In some cases, sentence splitter module 406 may also perform stop word removal (for example, removing stop words such as "the," "in," "a," and "an") and/or stemming (for example, reducing a word to its stem or root).

In some embodiments, POS tagging module 408 may be configured parses sentences and associate a part of speech with each word token. POS tagging involves tagging each text token with a tag indicating a part of speech that the token corresponds to. For example, POS tagging may include tagging each text token with a tag indicating whether the text token represents a noun, a verb, an adjective, etc.

In some embodiments, entity resolution module 410 may perform multi-stage pattern matching to identify and annotate entities based on customized rules. Each rule may extract particular pieces of knowledge from the text of a document. For example, rule sets including one or more rules 414 may be custom developed specifically to extract clinical trial information. Some example rules included in rules 414 are shown in Table 5.

TABLE 5

| Rule Set | Description |
|---|---|
| Design Attributes | Identifies the set of design attributes, tagged earlier in the pipeline by the gazetteer, that characterize the trial being described. Allows variable number of design attributes, from one to six, within a single statement. A subsequent rule set filters out instances that are describing design attributes of an earlier study. |
| Design Interventions | Identifies the treatment methods used within the trial, including drugs, possibly at various dosage levels, and placebo. Leverages results of earlier rule sets that associate drugs with dosages and administration times. |
| Participant Condition | Identifies statements that describe the disease or condition that is the focus of the trial. Differentiates these from similar statements that describe other aspects or characteristics of the trial subjects. A subsequent rule set filters out instances that are describing |

TABLE 5-continued

| Rule Set | Description |
|---|---|
| | patient diseases or conditions that were addressed in earlier studies. |
| Age Range | Identifies age ranges for a clinical trial. |

As an example, the "Age Range" rule set may be configured to analyze the text tokens to identify whether the ages of patients included in a given clinical trial fall within a predefined age range bracket. The Age Range rule set may include a customize software implementation that searches the tokens, identifies portions of the prose that likely describe an age range, and extracts appropriate values. For example, the pseudocode below is an illustrative rule for identifying/extracting an age range of a clinical trial based on the prose of the unstructured document.

Example Age Range Rule Pseudocode

```
Phase: AgeRange
Input: Token Number Lookup Split
Options: control = appelt
Rule: NotAgeRange
Priority: 1000
// 18-55 years later
(
  (
    ({Number}):lower
    ({Token.string == "—"}|{Token.string == "to"})
    ({Number}):upper
  )
  ({Lookup.majorType == "date_unit"}):unit
  ({Token.string == "after"}|{Token.string == "later"})
):range
-->
{ }
```

In some embodiments, entity synthesis subsystem 116 may derive knowledge from the extracted value (for example, information derived by performing operations to the extracted data). In some embodiments, entity synthesis subsystem 116 may perform semantic analysis operations to identify semantic and/or contextual information regarding a given document. Entity synthesis subsystem 116 may implement natural language modeling techniques to identify symbols, alphanumeric characters, n-grams (for example, words), phrases, sentences, and the like, that describe results and/or outcomes of a corresponding clinical trial based on the published technical document's content. Entity synthesis subsystem 116 may further apply semantic analysis techniques to categorize the extracted and derive second-order features/knowledge from the extracted content.

There is significant uniformity in the set of parameters used in clinical trial design and the manner in which they are described in technical publications. There is greater variability in the parameters used to represent trial results and the ways in which they are presented in the literature (for example, body of the document, tables, figures, etc.). Therefore, for these reasons, clinical trial literature may not be suitable to implement a rule-based approach used to capture trial design information from trial results. Entity synthesis subsystem 116 may execute operations to capture results information. In this way, entity synthesis may also be referred to as "knowledge synthesis," as knowledge is derived from a document's text. The objective of knowledge synthesis is to combine evidence inferred from unstructured text, which forms the basis for answering certain types of queries. In particular, entity synthesis subsystem 116 may identify trial outcomes in unstructured text and to associate derived information such as sentiment or polarity, which can be represented at different levels of granularity, about these outcomes. The flow of the knowledge synthesis process of entity synthesis subsystem 116 is described, for example, in FIG. 5.

Figure 5:
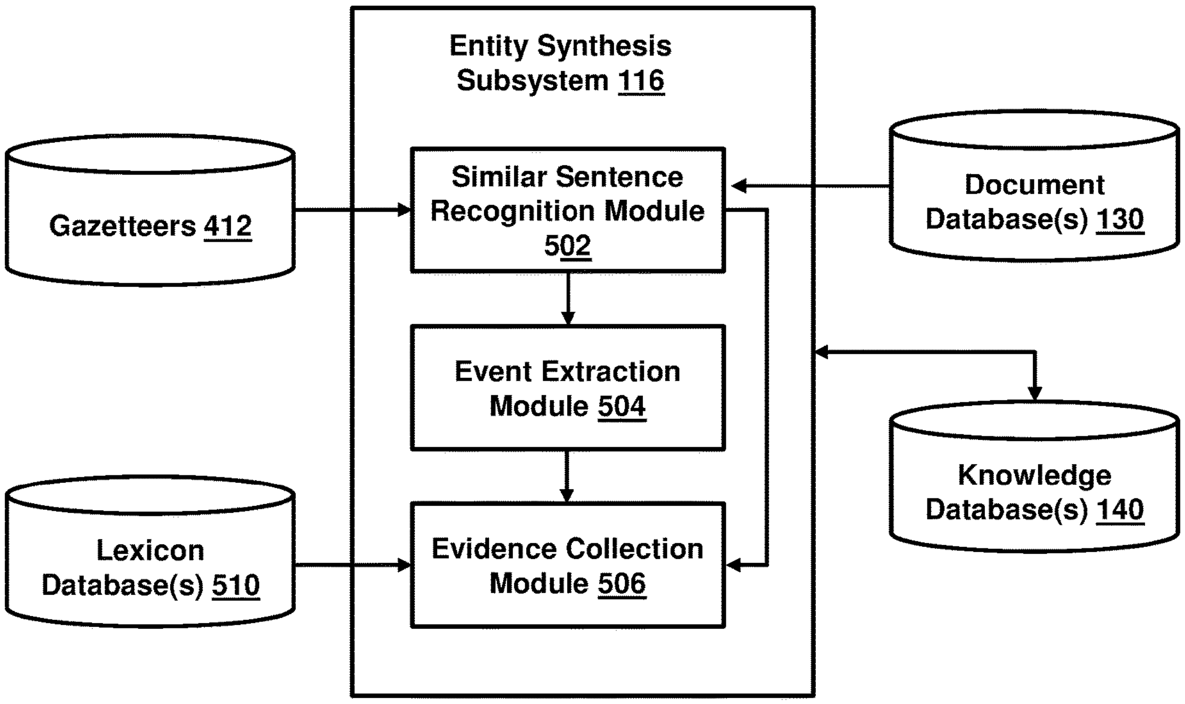
FIG. 5 is a diagram of an entity synthesis subsystem used to perform knowledge synthesis to a document, in accordance with various embodiments.

FIG. 5 may include various knowledge synthesis modules to form a knowledge synthesis pipeline. For instance, entity synthesis subsystem 116 may include a similar sentence recognition module 502, an event extraction module 504, an evidence collection module 506, or other modules. In some embodiments, the inputs to knowledge synthesis pipeline of entity synthesis subsystem 116 may be prose documents, ranging from abstracts of published technical articles to full-text representations of published articles. For instance, similar sentence recognition module 502 may retrieve one or more documents from document database 130. The documents may be obtained periodically or upon request. In some embodiments, the documents may be processed prior to being analyzed by similar sentence recognition module 502 (for example, tokenized, tagged, etc.). Additionally, entity synthesis subsystem 116 may also take, as input, lists of terms to be detected within the text of the documents. For example, similar sentence recognition module 502 may obtain lists of diseases, lists of pharmaceutical drugs, or other lists, from various repositories (for example, such as gazetteers 412). The lists may include medical/drug ontologies as well as lexical resources for opinion mining and polarity assessment. Even though there is variety in how outcomes and results are reported across trials, these outcomes and results can often be represented in prose with certain patterns and/or regularities specific to a scientific domain (for example, medicine). This makes the identification of candidate text representing trial outcomes amenable to information retrieval techniques.

In some embodiments, similar sentence recognition module 502 may identify sentences in a document that are representative of a trial's outcomes using the rule sets mentioned previously. For example, for a new full-text article, similar sentences that match a profile of efficacy outcomes or results from previously analyzed clinical trials may be recognized. The profile-based approach may be adapted to detect regularities in text based on commonalities in how authors use language within the medical domain (or other domains depending on the configurations and design of computer system 102). Similar sentence recognition module 502 may implement an NLP similarity recognition model that uses information retrieval techniques to extract information from the documents text. For example, a vector space model, a latent semantic analysis, or other information extraction processes may be used by similar sentence recognition module 502.

The vector space model may represent documents as vectors of terms, and may identify similar documents, similar portions of documents (for example, similar sections, sentences, paragraphs, etc.), by computing a similarity metric, such as a cosine similarity. In some embodiments, the vector space model, implemented by similar sentence recognition module 502, may retrieve (or construct) a feature vector for a document's text tokens, strings of text tokens (for example, sentences, paragraphs), or the document's entire text, or other sub-sections of the document's text. For example, if a given sentence includes ten text tokens, which may correspond to a 10-word sentence, the vector space module may compute a similarity score for the text tokens. The similarity may be with respect to other strings of text tokens in the document, or to other strings of text tokens found in other documents. In some embodiments, the similarity score, which is also referred to herein interchangeably as a similarity metric, refers to a distance between two feature vectors in a feature space formed based on the dimensionality of the text token feature vectors. In some embodiments, the distance between two feature vectors, refers to a Euclidian distance, an L2 distance, a cosine distance, a Minkowski distance, a Hamming distance, or any other vector space distance measure, or a combination thereof.

In some embodiments, semantically related words or phrases may be identified using various natural language processes such as Latent Semantic Analysis (LSA) or Word2Vec. Latent semantic analysis (LSA) and/or latent semantic indexing may be used to determine documents having similar text. Additionally techniques for identifying topically or otherwise semantically related terms or phrases include Latent Dirichlet Allocation (LDA), Spatial Latent Dirichlet Allocation (SLDA), independent component analysis, probabilistic latent semantic indexing, non-negative matrix factorization, and Gamma-Poisson distribution.

Both of the LSA and vector space model, as well as other semantic analysis techniques, are based on a reduced dimensional representation of documents, which can be used to rank candidate text paragraphs and return the best match to the profile as the "result" of a trial. In the case of abstracts, certain contextual elements in the text (for example, headers and keywords) may be used as indicators that reflect where the content described by a results section. If such indicators are not available in the abstract, text data representing the entire abstract may be retrieved. This can allow similar sentence recognition module 502 to ensure that a maximum amount of information is available for event extraction and evidence collection. In some embodiments, event extraction module 504 may store the events in memory, tag the tokens representing the events, or the like. For example, a text token determined to represent an event may be flagged and stored in memory with the flag.

Event extraction module 504 may execute operations to identify particular events within information obtained from similar sentence recognition module 502. An "event," as described herein, represents a clinical trial outcome that should be flagged. The events may be detected using a keyword spotting model, a convolutional neural network, or other machine learning models, or combinations thereof. In some embodiments, event extraction module 504 may analyze some or all of the text of a document (for example, unstructured text data of a document) to determine whether the text includes any terms included in a predefined list of events or event types. As an example, some pre-specified event types may include: adverse, compare, efficacy, placebo, predict, relapse, and safety, however additional event types may be added or removed from the list. Each of the event types may be crafted to capture commonly reported effects in clinical trial literature. In other words, event types are keywords or tags that make it easier for a user to search for and compare results across different clinical trials. The results may then be displayed within a graphical user interface provided to client device 104 for rendering and interaction with a user. For instance, the graphical user interface may be generated to highlight the presence of any of the pre-specified event types in retrieved text, making it easier for the user to parse the results. Furthermore, event extraction module 504 may recognize events at the sentence level along with their constituent clauses.

Evidence collection module 506 may derive knowledge about the document, such as knowledge related to a trial outcome. For each event, evidence collection module 506 may obtain linguistic evidence about a trial's outcome (for example, positive/negative evidence) in the form of two measures: a first metric indicating a polarity of the outcome, which may be referred to herein interchangeably as a "polarity metric," and a second metric indicating a strength of the outcome, which may be referred to herein interchangeably as a "strength metric." In some embodiments, the polarity metric may measure the sentiment of an outcome, and may classify the sentiment into one of a set of sentiment classes. For example, the set of sentiment classes may include the following sentiments: positive, negative, and neutral. Each trial outcome may be assigned a value reflecting the sentiment class. In some embodiments, the strength metric may measure an intensity of an outcome. The intensity may be classified into one of a set of intensity classes. For example, the set of strength classes may include the following intensities: strong, weak, and neutral.

In some embodiments, one or more lexical resources stored in lexicon database 510 may be implemented by evidence collection module to compute scores for the polarity metric and the strength metric. Some example lexicon resources such as an NLP sentiment analysis model may include General Inquirer and WordNet, however other lexical resources may be used. For example, the lexical resources may map a text file with counts of pre-defined lexical categories. Each category includes a list of words and word senses. Examples of words that are classified as 'strong' include 'sustained' and 'elevated'. An example of a word that is classified as 'strong' and 'positive' is 'improvement' and a word that is classified as 'weak' and 'negative' is 'atrophy'. In some embodiments, evidence may be collected for computing the polarity metric and the strength metric at the paragraph level (in other words, polarity and strength being calculated across an entire paragraph).

In some embodiments, evidence collection module 506 may further compute a third metric measuring variations in clinical values, which may be referred to herein interchangeably as a "change metric." Some example sets of change classes may include the following change indicators: more, less, and none. In other words, an 'increase' in some quantity exemplifies 'more' while a 'decrease' in the quantity exemplifies 'less'. In some embodiments, the change metric may be measured at the paragraph level. However, the change metric may be measured at other levels such as the sentence level, section level, or document level, and/or other levels. The change measurement may depend on the level of granularity and precision of measuring the change metric. For instance, short sentences may not present sufficient text to measure the change metric. In this instance, paragraph-level change metrics may be measured. Collectively, the set of metrics (for example, polarity metric, strength metric, change metric) encapsulate derived knowledge about a trial outcome that is inferred from the best-matching results. Individually, polarity, strength, and change serve as article ranking functions that can be used to compare search results as described in the use case. The outputs of evidence collection module 506—extracted results or outcomes and derived evidence measures (polarity, strength, and change)—may be added to a data structure stored in knowledge database 140 in association with corresponding document. The values for each data field and can be queried by an end user accessing knowledge database 140 via a graphical user interface (for example, a web interface accessed by a web browser functionality executing on client device 104).

Figure 6:
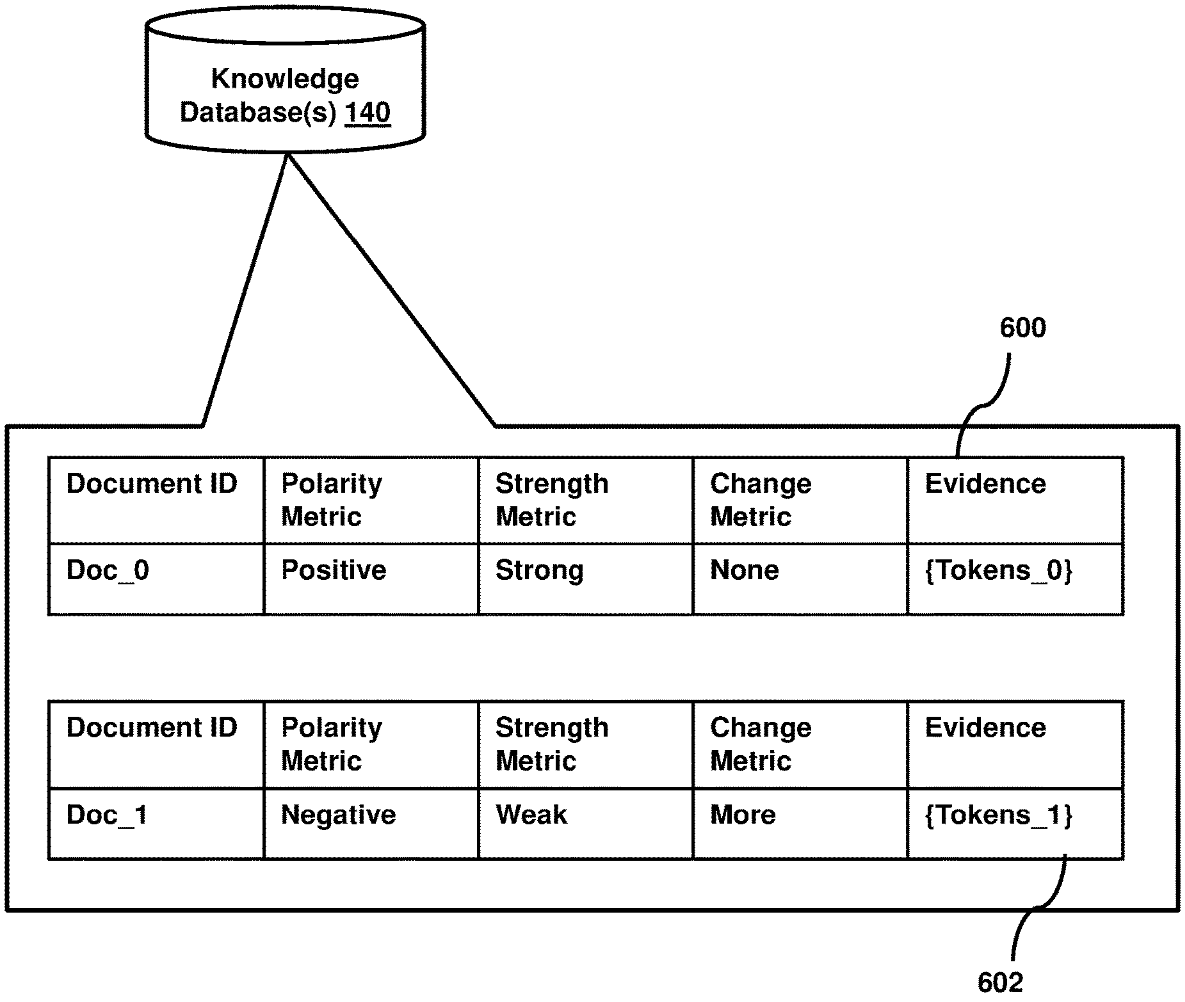
FIG. 6 is a diagram of a knowledge database, in accordance with various embodiments.

As an example, with reference to FIG. 6, knowledge database 140 stores two example data structures including knowledge derived from a corresponding document. For instance, data structure 600 and data structure 602 may each store knowledge derived for a first document, identified using identifier Doc_0, and a second document, identifier using identifier Doc_1. The document identifiers may be the same or similar to those included in data table 200 of FIG. 2. Each of data structures 600, 602 may include data fields corresponding to each of the metric, tokens used by evidence derivation process, or other data. The data fields may have values assigned thereto by entity synthesis subsystem 116. For example, data structures 600, 602 may include data fields corresponding to the polarity metric, the strength metric, the change metric, and the evidence used to compute those metrics.

An experiment to check the accuracy of the knowledge synthesis pipeline was conducted to generate results for more than 3,000 full-text articles and more than 755,000 abstracts. In the experiment, a random sample of 50 full-text articles were analyzed using results of the vector-space model technique and latent semantic indexing technique, which is reflected in Table 6. As seen from Table 6, the vector-space model technique and latent semantic indexing technique both achieved Top-N precision, for N=1, of 94% for best-match retrieval of a trial result.

TABLE 6

| Information Retrieval Method | Precision at Top-N (N = 1) |
|---|---|
| Vector space model | 94% |
| Latent semantic analysis | 94% |

In some embodiments, as detailed below, a 'back off' strategy for information retrieval techniques can be used to detect trial outcomes one. Generally speaking, the back off strategy uses increasingly less information to increase result count. By generalizing query terms/phrases, the context of the query can be expanded. As an example, the back off strategy may start at one n-gram and "back off" to a lower-order n-gram (for example, n−1) if there is determined to be no higher-order n-grams.

By performing aggregate analysis of clinical trial articles, entity synthesis subsystem 116, and more generally, computer system 102, may obtain descriptive statistics of word usage and expression in published technical articles in terms of sentiment, polarity, change, and/or other measures. In some embodiments, entity synthesis subsystem 116 may discover relationships that may explain why an article's author(s) chose to present particular trial results. For example, computer system 102 may measure whether there is a relationship between 'positive' words and 'strong' words appearing together in articles, 'negative' and 'weak' words that appear together in articles, and the like. For example, Table 7 displays the relationship described above exhibit a stronger relative correlation in the latter case than in the former.

TABLE 7

| Properties of words | Pearson Correlation Coefficient, p-value |
|---|---|
| "Positive" words vs. "strong" words | 22%, $p < 0.001$ |
| "Negative" words vs. "weak" words | 28%, $p < 0.001$ |
| "Increasing" change vs. "strong" word-clusters | −39%, $p < 0.001$ |

In addition to performing a coarse level of granularity (paragraph-level), computer system 102 may perform a finer-grained analysis to see if additional relationships in the data can be inferred. Certain phrases may be associated with specific responses, such as a 'sustained response'. For example, when such a phrase is detected, (for example, bearing 'strength'), is it likely that a net 'change' will also be detected in an article? As another example, a determination may be made as to whether if such a result is associated with measurements, conditions, etc., is a net 'increase' in change also detected? In Table 7, a statistically significant relationship in the opposite direction: an 'increase' in change is shown to negatively correlate with the 'strength' of words clusters. This suggests that, in most cases, an increase in some measurable quantity is not associated with a strong result (for example, an 'increase' in a patient's body temperature is, in many cases, not associated with a strong trial outcome).

In some embodiments, data alignment subsystem 118 may match clinical trials described in published technical articles (for example, scientific journals/abstracts) to clinical trials stored in knowledge database 140, including clinical trials identified from documents having structured data. In some embodiments, data alignment subsystem 118 may use metadata (for example, clinical trial identifier) and clinical trial design information extracted from published technical articles to identify matching clinical trials.

Journal articles and clinical trial records may represent two complementary sources of information about clinical trials. Therefore, identifying a commonality between documents from each of these two sources may be used to generate an integrated knowledge database. Data alignment subsystem 118 may identify such correspondences and builds a joint knowledge database stored in knowledge database 140.

In some cases, the correspondence between the sources is explicitly given in a structured field or the text of an article. For example, the document may include metadata indicating a clinical trial described by the unstructured text data of the document, such as a clinical trial reference identifier. A clinical trial record relating to the same clinical trial may be identified by metadata stored in association with the clinical trial record that also includes the clinical trial reference identifier. In these cases, alignment between unstructured data, from documents such as published technical articles, with structured data from clinical trial records may include finding the right fields or patterns in the text.

In some embodiments, the information sources may not give an explicit correspondence, even when the two sources are describing the same trial. To address this problem, data alignment subsystem 118 may include a structured approximate matching function configured to identify the closest clinical trial record match to published technical document and differentiate between documents having corresponding clinical trial records and documents without corresponding clinical trial records.

Figure 7:
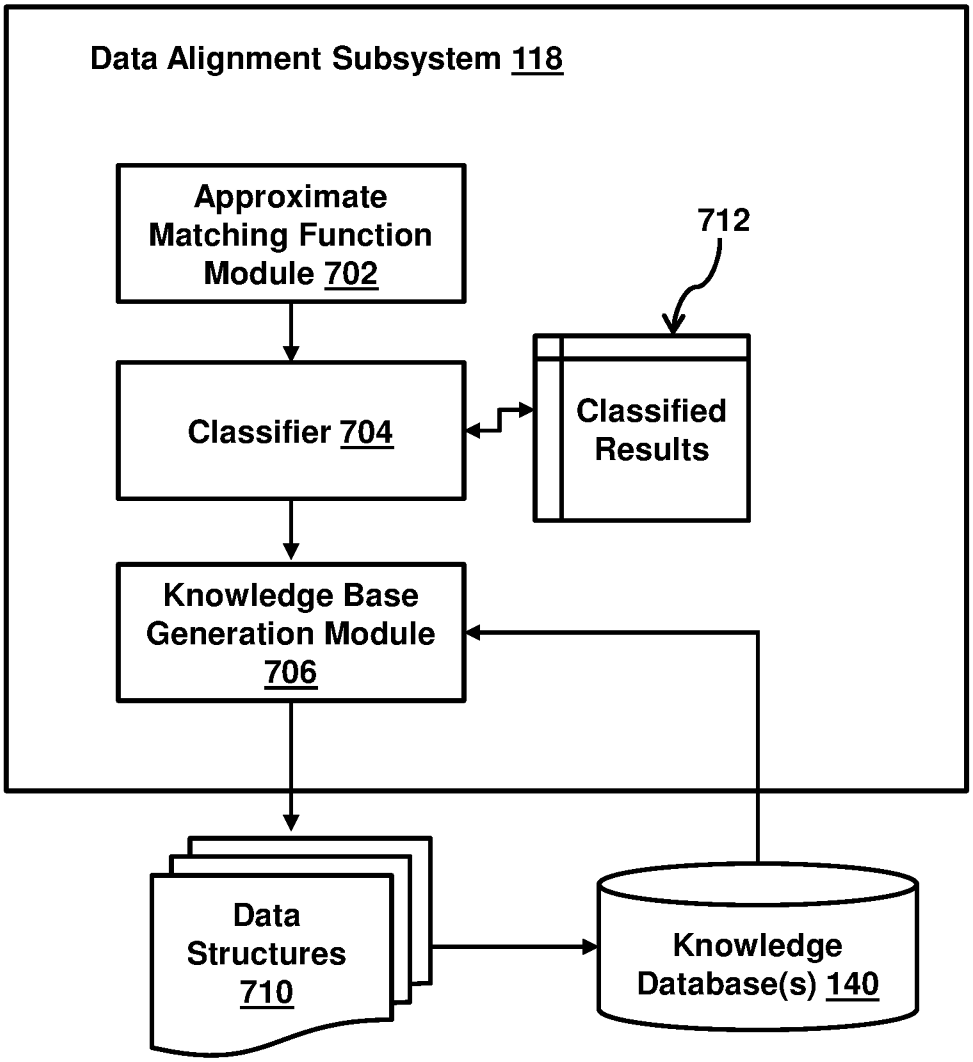
FIG. 7 is a diagram of a data alignment subsystem used to determine correspondences between structured and unstructured data, in accordance with various embodiments.

As an example, with reference to FIG. 7, data alignment subsystem 118 may include an approximate matching function module 702, a classifier 704, knowledge database generation module 706, or other modules.

Approximate matching function module 702 may obtain the output of the knowledge extraction process, as described above with respect to information model 300, which is based on clinical trial schema, to find good matches in the knowledge database stored in knowledge database 140. In some embodiments, each extracted field (for example, authors, allocations, etc.) may be an added clause to an elastic search query. An elastic search query refers to a process whereby approximate text matching is performed to rank the (clinical trial) records based on the overall quality of the matches across all clauses. Some fields, such as study title and enrollment, may be used to narrow down possible matches better than others (for example, phase, country), so match ranks are weighted to emphasize these fields more.

In some embodiments, approximate matching function module 702 may implement a random optimization approach to identify an appropriate field weighting scheme. Using documents (for example, published technical articles) having known clinical trial numbers as training and validation data, a weighting vector may be iteratively perturbed. The weighting vector may be evaluated on the training data and the perturbation may be kept it improved the ranks for the correct matches. In some embodiments, the random optimization approach may facilitate a decrease in the average rank of correct matches (for example, by about 50%). Therefore, while the correct match was the top returned result (for example, the #1 returned result out of 250,000 records for 38% of journal articles), a large majority (for example, 70%) of the published technical articles had the correct match in the top ranked results. Thus, the random optimization approach's high degree of matching is a strong indication of the quality of the information extraction process.

Classifier 704 may classify top results as matches or not matches. Not all articles have corresponding clinical trial records, in addition to ranking matches, data alignment subsystem 118 may differentiate top matches that are correct from top matches that are not correct. Classifier 704 may implement identified discriminative features from the distribution of scores among top returned classification results 712. Using these results, a support vector machine (SVI), or other classifier, may be trained to classify the top result as a correct match or not. In some embodiments, a large gap between a top classified result and a next highest scored result may indicate that the top scored result is the correct match. Various searching processes may be used to compute the matching score such as, as a non-limiting example, Elastic Search.

In some embodiments, knowledge database generation module 706 may generate data structures 710, which form the knowledge database stored in knowledge database 140. After the data alignment steps performed by approximate matching function module 702 and classifier 704 are completed, data structures already stored in knowledge database 140, which form the clinical trials knowledge database, may be augmented is augmented. In some embodiments, for published technical documents having corresponding clinical trials, the information that has been extracted is added to the clinical trial's record. In some cases, knowledge database generation module 706 may retrieve the clinical trial records identified from the published technical document (for example, based on a clinical trial identifier), and may update the retrieved clinical trial records to include the extracted classification results. In some embodiments, for published technical documents lacking a listing of corresponding trials, a new clinical trial record may be added to the knowledge database by generating a new data structure having data fields populated with values extracted from the published document prose and from knowledge derived from classification results 712. along with all extracted fields and results. Now, with clinical trial records having the updated knowledge derived from published technical articles, the knowledge database can be improved to provide additional data/knowledge, not previously provided at scale, while also being accessible using structured search techniques.

In some embodiments, computer system 102 may additionally implement knowledge database indexing and search functionality. For example, search engines, such as Elastic Search, can be used as one type of indexing functionality. In some embodiments, the knowledge database may different data fields to include values stored as free-form text, which can be retrieved and searched. The data structures stored in knowledge database 140 (and thus forming the knowledge database) may be facilitate indexed searches for strings within a text field, string match scoring metrics to assess document relevance to a query, and approximate string-matching using tokenization and fuzzy matching.

A reliable and scalable workflow management system is needed to make the pipelines of knowledge extraction, synthesis, and alignment operate successfully and deliver the correct and accurate data in a timely manner. In some embodiments, the workflow may use directed acyclic graphs (DAGs) for managing the work flow. Some example workflow schedulers include Airflow, Oozie, or other workflows. The workflow may be used to programmatically author, schedule, and monitor data workflows. Computer system 102 may implement the workflow or may leverage an external service to manage the workflow. For example, in the case of Airflow, the workflow may be defined a series of tasks via a DAG, capturing inter-task dependencies. The workflow process may manage distributed processing of the various tasks, facilitate scalability, and trigger a set of tasks (for example, those performed by modules 112-118) when a new document is populated to document database 130. In some embodiments, the workflows may be defined with a set of "operators," which are extensible, and therefore facilitate customization workflows to handle tasks such as information retrieval, data analysis, metric aggregations, extraction, and synthesis. As an example, the workflow may integrate software components, manage the dependencies between jobs of information retrieval, perform knowledge extraction and synthesis, process results, and perform alignment and file management (for example, indexing). As another example, the workflow may handle retries and upstream failures in the case of dependent jobs, and may also automatically sense new data arriving (for example, from structured data source 106 or unstructured data source 108) and to start pipeline with tasks defined in a DAG. In a typical pipeline, the data will be pulled from document database 130, transformed, staged or archived, then transferred and loaded to computer system 102.

In some embodiments, two primary workflows may be used to represent distinct use-cases: automatic import mode (AIM) and manual import mode (MIM). The AIM workflow may automatically build and update the knowledge database stored in knowledge database 140 from various databases and data sources (for example, document database 130, structured data sources 106, unstructured data sources 108, etc.). The MIM workflow may monitor a folder for additional sources of information provided by users. The AIM and MIM workflows have most steps in common, but the initial steps, their triggering mechanisms, and the expected execution time, can differ. For instance, knowledge database construction is expensive relative to knowledge database updating (assuming a significantly smaller ingest of data for an update). However, on a typical schedule, which can be specified/adjusted, the "construction" operation is expected to be performed less frequently compared to daily updates.

In some embodiments, query reception subsystem 120 may receive a request from an end user via the end user's corresponding client device (for example, client device 104), where the request includes a query formed of one or more query terms. Query reception subsystem 120 may access document database 130 and/or knowledge database 140 to obtain results based on the input query. In some embodiments, query reception subsystem 120 may perform pre- and/or post-processing techniques to the query to obtain additional information/documents (for example, applying a backoff search strategy).

In some embodiments, query reception subsystem 120 may be further configured to generate, manage, and provide a graphical user interface (GUI) for reception of query terms from a client device. For example, with reference to FIG. 8, a GUI 800 is shown to demonstrate the breadth and depth of information available in the unified knowledge database stored by knowledge database 140. GUI 800 may enable users to generate sophisticated and detailed queries to identify clinical trials based on specific characteristics via a web interface, mobile interface, or other form of interface. For example, a user may access GUI 800 via a web browser of client device 104, and may input one or more query terms into one or more search fields depicted within GUI 800.

In some embodiments, result formulation subsystem 122 may convert, parse, and interpret the data returned by the knowledge database and presents it in a user-friendly form. For example, result formulation subsystem 122 may generate a user interface including graphical representations of a top N results of the query, which can be displayed and accessed by the end user via the end user's client device.

Figure 9:
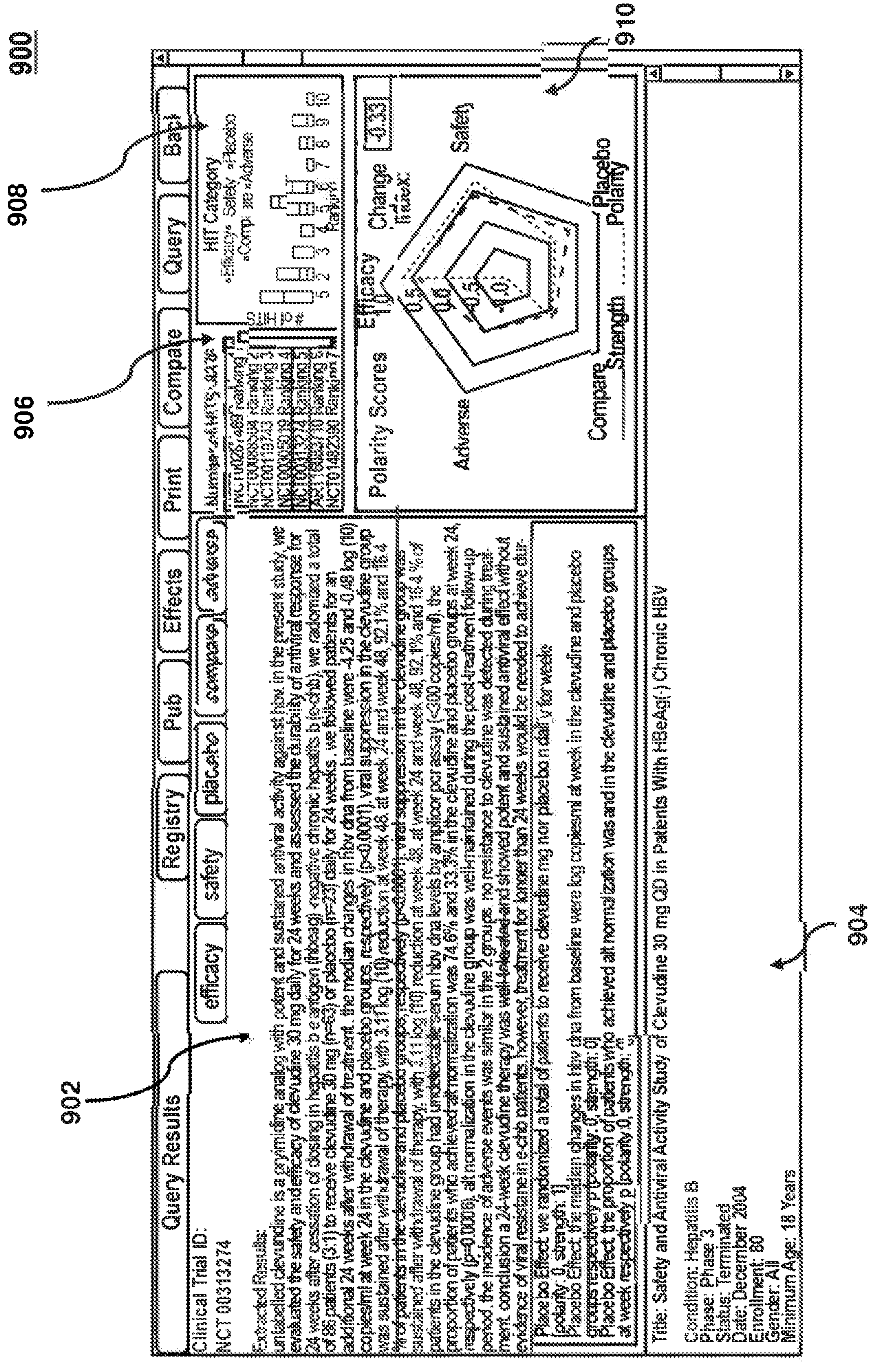
FIG. 9 is a diagram of a graphical user interface capable of being rendered on a display of a client device for presenting results of a query to a knowledge database, in accordance with various embodiments.

As an example, with reference to FIG. 9, a graphical user interface (GUI) 900 is shown including results of the submitted query. In some embodiments, result formulation subsystem 122 may generate GUI 900 to provide users with a mechanism to explore, evaluate, and interact with the results. Furthermore, it provides direct access, where available, to the source information that was used to populate the knowledge database stored by knowledge database 140. Users can, therefore, explore in the knowledge database's content in greater detail, verify results, or perform other tasks.

Figure 8:
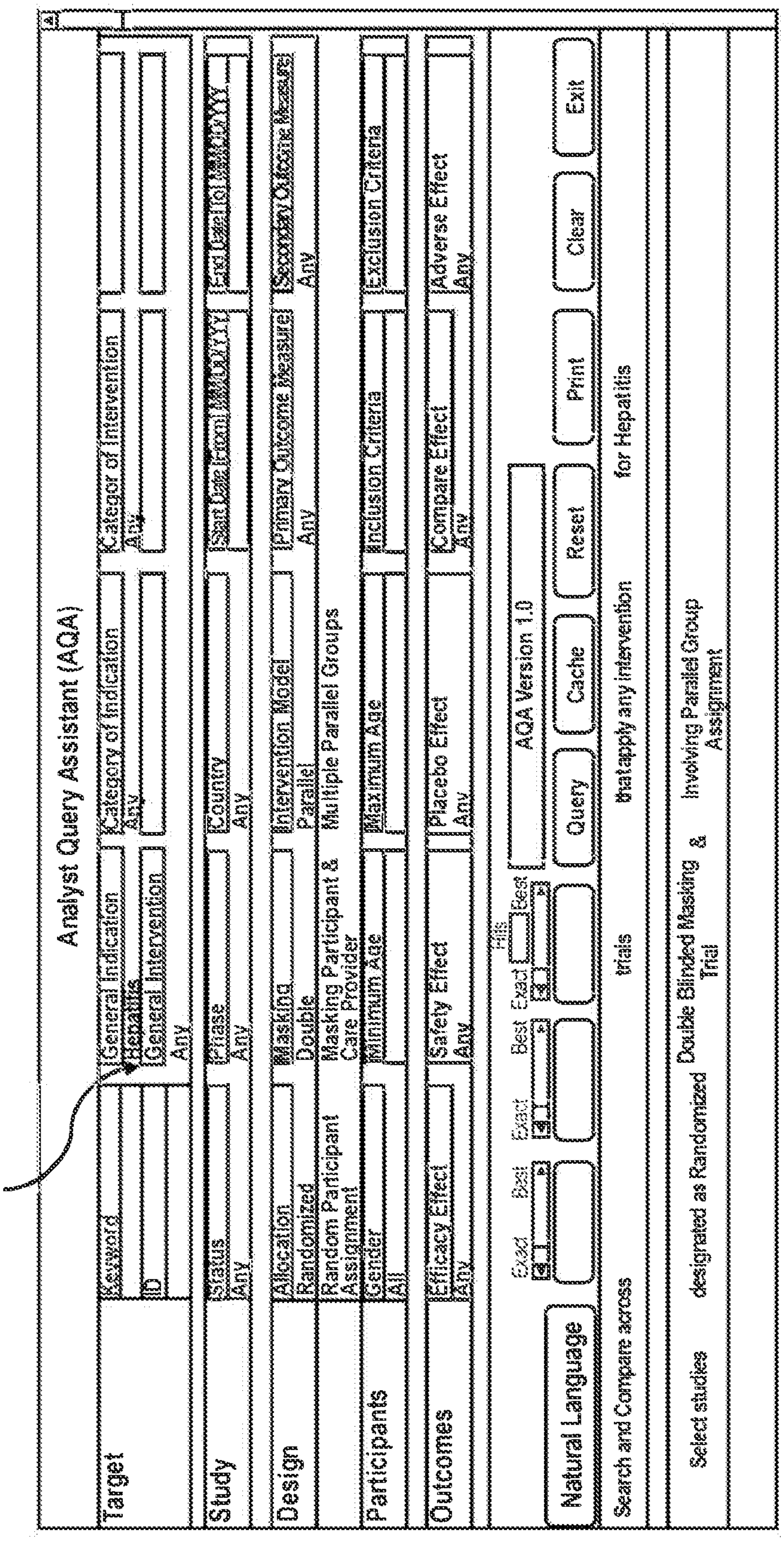
FIG. 8 is a diagram of a graphical user interface capable of being rendered on a display of a client device for facilitating queries of a knowledge database, in accordance with various embodiments.

Looking at FIGS. 8 and 9, a user has input a query. To do so, GUI 800, rendered on client device 104, may receive an input 802 including a query term "hepatitis" inserted into a "General Indication" search field of the "Target" class. Input 802 may be provided via a text input, a voice input, a drop-down menu, or via another mechanism, or a combination thereof.

GUI 900 displays search results based on a query, as indicated by input 802. In particular, GUI 900 may display a section 902 including a best-match extracted result from a trial's outcomes, a section 904 including the characteristics of the best-match extracted result's corresponding trial, a section 906 including a ranked list (for example, top 10) of the top matched clinical trial identifiers, a section 908 including a histography or other graphic of detected events in extracted results by event type, a section 910 including a multi-variate comparison of polarity/strength/change metrics for each events in a result, or other sections. In some embodiments, section 910 may be displayed as a spider-chart, however other chart forms may be used.

Computer system 102, and system 100 in general, provide an end-to-end knowledge discovery system that builds on the structure of clinical trial registries and can automatically ingest content from published technical articles with the goal of enhancing the coverage of such databases and facilitating increased understanding of clinical trial design parameters and results. System 100 has an architecture that is flexible and provides a repeatable workflow for extracting both structured and semi-structured elements from free-text publications (for example, using a 'back off' strategy), aligning structured elements with the structure of a clinical trial repository, and augmenting data structures with additional searchable clinical trial features or characteristics derived from insightful and meaningful analysis of the data. As new data (for example, published technical articles) become available, system 100 can ingest, extract, align, and synthesize new knowledge, making the knowledge database scalable, having increased efficiency and understanding of clinical trial designers.

Flowcharts

Figure 10:
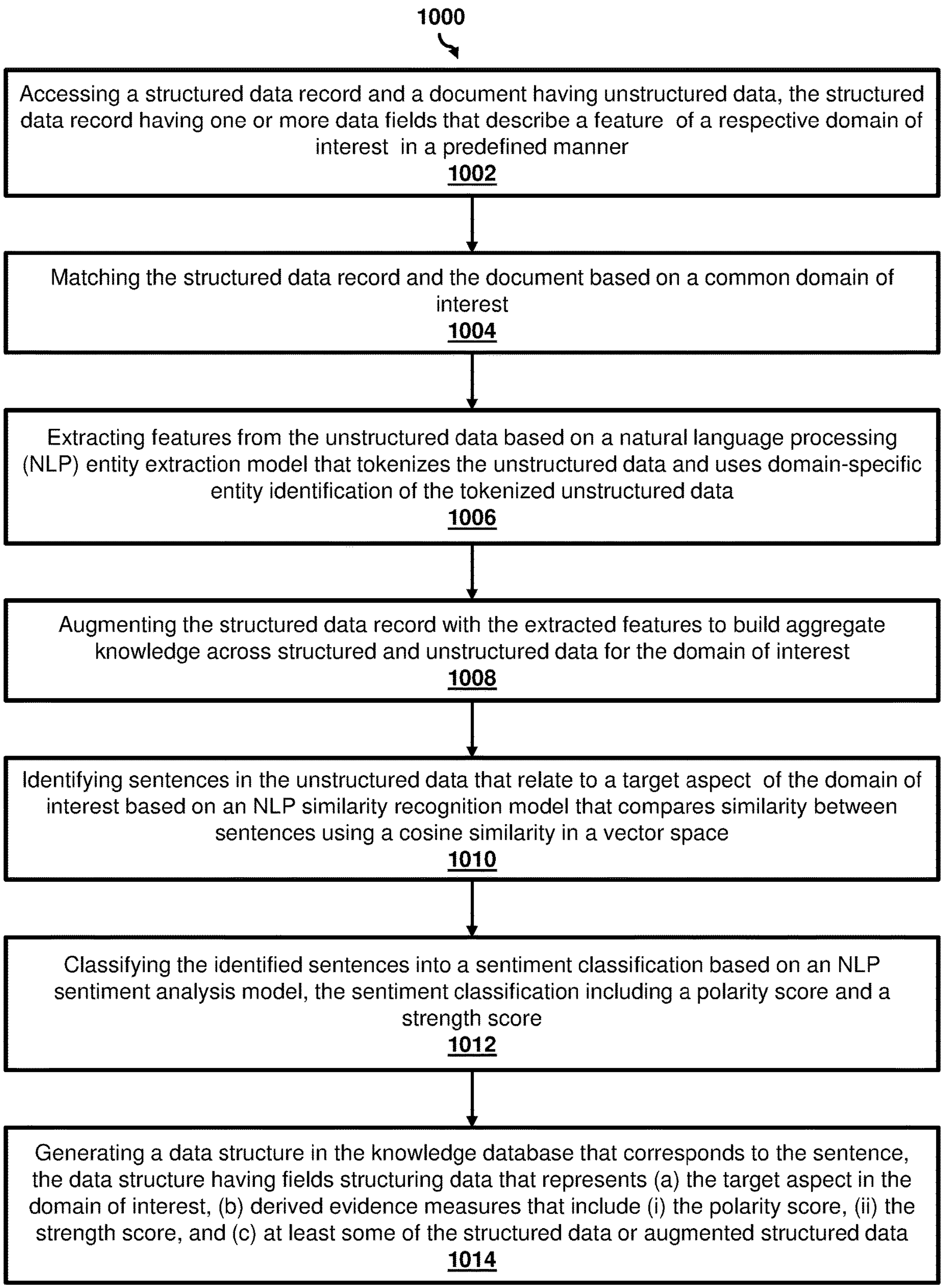
FIG. 10 illustrates an example of a method of generating a knowledge database, in accordance with various embodiments.

FIG. 10 illustrates an example of a method 1000 of generating a knowledge database (such as a knowledge database 140), in accordance with various embodiments.

At 1002, the method 1000 may include accessing a structured data record (such as structured data records from structured data sources 106) and a document having unstructured data (such as a journal article or abstract from unstructured data sources 108), the structured data record having one or more data fields that describe a feature of a domain of interest in a predefined manner. An example of a feature includes a clinical trial design parameter and an example of a domain of interest includes a clinical trial (for a particular therapeutic).

At 1004, the method 1000 may include matching the structured data record and the document having unstructured data based on a common domain of interest. For example, the method 1000 may include querying the structured data source 106 for a clinical trial identifier in based on a named field and may parse the clinical trial identifier from the journal article so as to determine that they both relate to the same clinical trial identified by the clinical trial identifier.

At 1006, the method 1000 may include extracting features from the unstructured data based on an NLP entity extraction model that tokenizes the unstructured data and uses domain-specific entity identification of the tokenized unstructured data. For example, the 1006 may include processing by the entity extraction subsystem 114.

At 1008, the method 1000 may include augmenting the structured data record with the extracted features to build aggregate knowledge across structured and unstructured data for the domain of interest. For example, the structured data record may be missing one or more extracted features from the one or more fields. In this instance, the method 1000 may include inserting the missing features into the one or more fields. This may enable later information retrieval that would have otherwise been not possible since those features were missing from the structured data record. In particular, the structured clinical trial records may be missing a clinical design parameter that is included in a journal article. The missing clinical design parameter may have been extracted from the journal article and included in the knowledge database so that the clinical design parameter is now available for retrieval.

At 1010, the method 1000 may include identifying sentences in the unstructured data that relate to a target aspect of the domain of interest based on an NLP similarity recognition model that compares similarity between sentences using a cosine similarity in a vector space. It should be noted that instead of or in addition to sentences, words, phrases, paragraphs, or other segments may be analyzed at 1010. In some examples, the similarity is based on regularities in language used for the target aspect and uses the regularities to predict that an input sentence is similar to a sentence previously known to relate to the target aspect and a ranking of sentence similarity using latent semantic indexing. An example of the target aspect may include an outcome of a clinical trial. In this example, 1008 may include identifying sentences in a journal article that are similar to sentences in previously analyzed journal articles that are known to describe clinical trial outcomes.

At 1012, the method 1000 may include classifying the identified sentences into a sentiment classification based on an NLP sentiment analysis model, the sentiment classification including a polarity score and a strength score. For example, the 1012 may include processing by the entity synthesis subsystem 116.

At 1014, the method 1000 may include generating a data structure in the knowledge database that corresponds to the sentence, the data structure having fields structuring data that represents (a) the target aspect in the domain of interest, (b) derived evidence measures that include (i) the polarity score, (ii) the strength score, and (c) some or all of the structured data or augmented structured data.

Examples of Systems and Computing Devices

Figure 11:
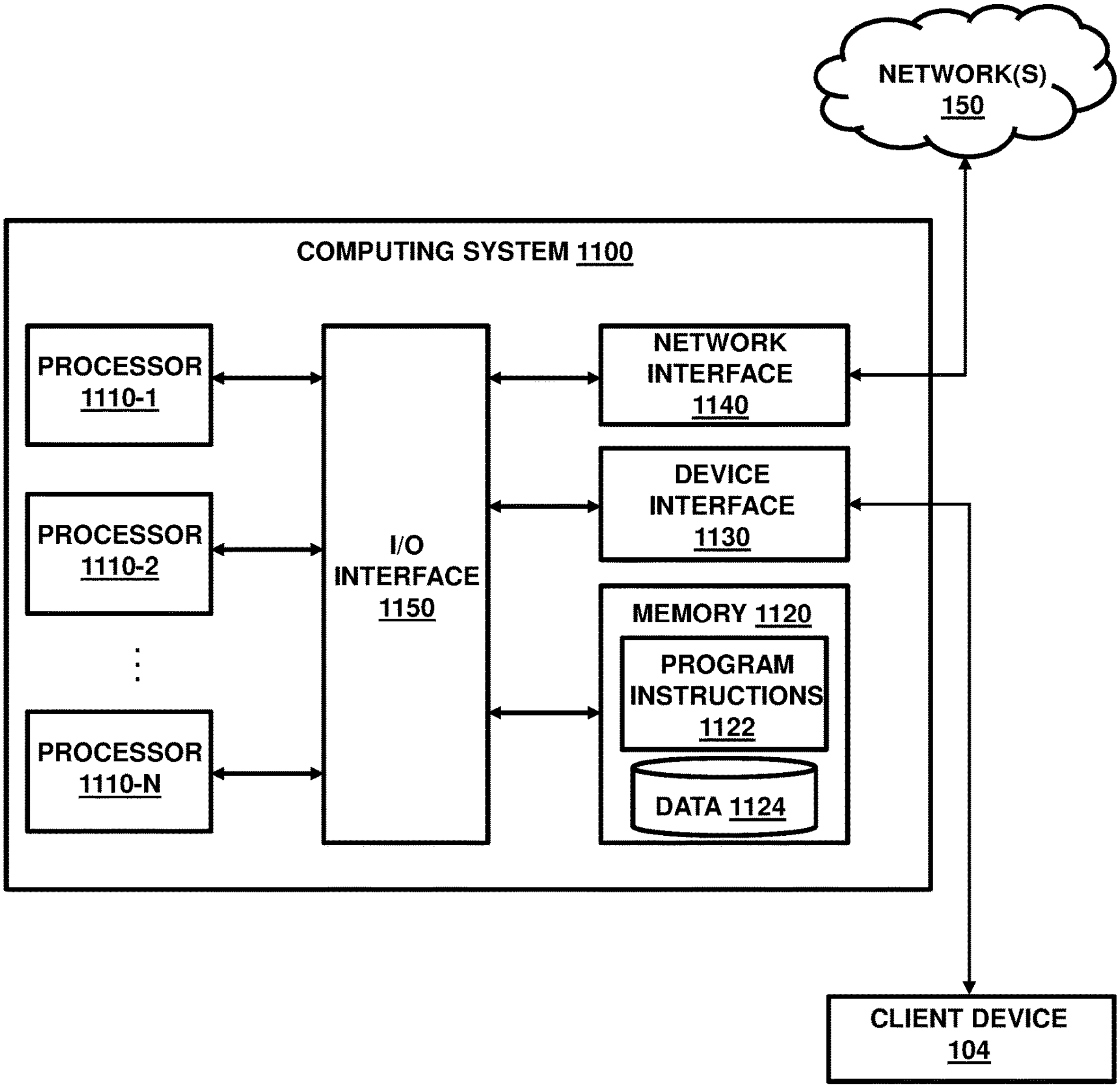
FIG. 11 illustrates an example of a computing system implemented by one or more of the features illustrated in FIG. 1, in accordance with various embodiments.

FIG. 11 illustrates an example of a computing system implemented by one or more of the features illustrated in FIG. 1, in accordance with various embodiments. Various portions of systems and methods described herein, may include or be executed on one or more computer systems similar to computing system 1100. Further, processes and modules described herein may be executed by one or more processing systems similar to that of computing system 1100. In some embodiments, computer system 102, mobile computing device 104, or other components of system 100 may include some or all of the components and features of computing system 1100.

Computing system 1100 may include one or more processors (for example, processors 1110-1-1110-N) coupled to system memory 1120, an input/output I/O device interface 1130, and a network interface 1140 via an input/output (I/O) interface 1150. A processor may include a single processor or a plurality of processors (for example, distributed processors). A processor may be any suitable processor capable of executing or otherwise performing instructions. A processor may include a central processing unit (CPU) that carries out program instructions to perform the arithmetical, logical, and input/output operations of computing system 1100. A processor may execute code (for example, processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (for example, system memory 1120). Computing system 1100 may be a uni-processor system including one processor (for example, processor 1110-1), or a multi-processor system including any number of suitable processors (for example, 1110-1-1110-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, for example, an FPGA (field programmable gate array) or an ASIC (application specific integrated circuit). Computing system 1100 may include a plurality of computing devices (for example, distributed computer systems) to implement various processing functions.

I/O device interface 1130 may provide an interface for connection of one or more I/O devices 1160 to computer system 1100. I/O devices may include devices that receive input (for example, from a user) or output information (for example, to a user). I/O devices 1160 may include, for example, graphical user interface presented on displays (for example, a cathode ray tube (CRT) or liquid crystal display (LCD) monitor), pointing devices (for example, a computer mouse or trackball), keyboards, keypads, touchpads, scanning devices, voice recognition devices, gesture recognition devices, printers, audio speakers, microphones, cameras, or the like. I/O devices 1160 may be connected to computer system 1100 through a wired or wireless connection. I/O devices 1160 may be connected to computer system 1100 from a remote location. I/O devices 1160 located on remote computer system, for example, may be connected to computer system 1100 via a network and network interface 1140.

Network interface 1140 may include a network adapter that provides for connection of computer system 1100 to a network. Network interface may 1040 may facilitate data exchange between computer system 1100 and other devices connected to the network. Network interface 1140 may support wired or wireless communication. The network may include an electronic communication network, such as the Internet, a local area network (LAN), a wide area network (WAN), a cellular communications network, or the like.

System memory 1120 may store program instructions 1122 or data 1124. Program instructions 1122 may be executable by a processor (for example, one or more of processors 1110-1-1110-N) to implement one or more embodiments of the present techniques. Program instructions 1122 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (for example, one or more scripts stored in a markup language document), in a single file dedicated to the program in question, or in multiple coordinated files (for example, files that store one or more modules, sub programs, or portions of code). A computer program may be deployed to be executed on one or more computer processors located locally at one site or distributed across multiple remote sites and interconnected by a communication network.

System memory 1120 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (for example, flash memory, ROM, PROM, EPROM, EEPROM memory), volatile memory (for example, random access memory (RAM), static random access memory (SRAM), synchronous dynamic RAM (SDRAM)), bulk storage memory (for example, CD-ROM and/or DVD-ROM, hard-drives), or the like. System memory 1120 may include a non-transitory computer readable storage medium that may have program instructions stored thereon that are executable by a computer processor (for example, one or more of processors 1110-1-1110-N) to cause the subject matter and the functional operations described herein. A memory (for example, system memory 1120) may include a single memory device and/or a plurality of memory devices (for example, distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1150 may coordinate I/O traffic between processors 1110-1-1110-N, system memory 1120, network interface 1140, I/O devices 1160, and/or other peripheral devices. I/O interface 1150 may perform protocol, timing, or other data transformations to convert data signals from one component (for example, system memory 1120) into a format suitable for use by another component (for example, processors 1110-1-1110-N). I/O interface 1150 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1100 or multiple computer systems 1100 configured to host different portions or instances of embodiments. Multiple computer systems 1100 may provide for parallel or sequential processing/execution of one or more portions of the techniques described herein.

Those skilled in the art will appreciate that computer system 1100 is merely illustrative and is not intended to limit the scope of the techniques described herein. Computer system 1100 may include any combination of devices or software that may perform or otherwise provide for the performance of the techniques described herein. For example, computer system 1100 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1100 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (for example, as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (for example, content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to cost constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (in other words, meaning having the potential to), rather than the mandatory sense (in other words, meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, in other words, encompassing both "and" and "or." Terms describing conditional relationships, for example, "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, for example, "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, for example, the antecedent is relevant to the likelihood of the consequent occurring. Statements in which a plurality of attributes or functions are mapped to a plurality of objects (for example, one or more processors performing steps A, B, C, and D) encompasses both all such attributes or functions being mapped to all such objects and subsets of the attributes or functions being mapped to subsets of the attributes or functions (for example, both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, in other words, each does not necessarily mean each and every. Limitations as to sequence of recited steps should not be read into the claims unless explicitly specified, for example, with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (for example, "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, for example, reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, for example, text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, for example, in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (for example, articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

A1. A method of aligning structured data with unstructured data that is processed through natural language processing models to generate an aggregate knowledge database, the method comprising: accessing a structured data record and a document having unstructured data, the structured data record having one or more data fields that describe a feature of a respective domain of interest in a predefined manner; matching the structured data record and the document based on a common domain of interest; extracting features from the unstructured data based on a natural language processing (NLP) entity extraction model that tokenizes the unstructured data and uses domain-specific entity identification of the tokenized unstructured data; augmenting the structured data record with the extracted features to build aggregate knowledge across structured and unstructured data for the domain of interest; identifying sentences in the unstructured data that relate to a target aspect of the domain of interest based on an NLP similarity recognition model that compares similarity between sentences using a cosine similarity in a vector space, wherein the similarity is based on regularities in language used for the target aspect and uses the regularities to predict that an input sentence is similar to a sentence previously known to relate to the target aspect and a ranking of sentence similarity using latent semantic indexing; classifying the identified sentences into a sentiment classification based on an NLP sentiment analysis model, the sentiment classification including a polarity score and a strength score; and generating a data structure in the knowledge database that corresponds to the sentence, the data structure having fields structuring data that represents (a) the target aspect in the domain of interest, (b) derived evidence measures that include (i) the polarity score, (ii) the strength score, and (c) some or all of the structured data or augmented structured data.

A2. The method of embodiment A1, further comprising: detecting, from the extracted features or metadata associated with the document, an occurrence of an identifier of the domain of interest within the unstructured data; and searching the knowledge database for data structures including the identifier of the domain of interest to obtain the structured data record.

A3. The method of embodiment A2, wherein augmenting the structured data records relating to the respective domain of interest with the extracted features comprises: updating the knowledge database with at least some of the extracted features based on a determination that at least one data field of the structured data record is missing.

A4. The method of any one of embodiments A2-A3, wherein augmenting the structured data records relating to the respective domain of interest comprises: generating a new structured data record responsive to determining that a structured data record associated with a second domain of interest is absent from the knowledge database, wherein the new structured data record comprises data fields populated by the values associated with one or more features extracted from one or more unstructured documents relating to another domain of interest.

A5. The method of any one of embodiments A1-A4, wherein identifying the sentences comprises: generating a first feature vector representing text included in a given sentence; mapping the first feature vector to a coordinate location in a multidimensional feature space; and determining a group of feature vectors having a distance from the coordinate location that is less than a distance threshold, wherein the sentences that are identified comprise sentences whose feature vectors map to coordinate locations in the multidimensional feature space that is less than the distance threshold.

A6. The method of any one of embodiments A1-A5, further comprising: generating a first feature vector representing the extracted features; generating, for the structured data record, a second feature vector representing each of the one or more data fields describing a respective feature of the domain of interest to obtain a set of feature vectors; computing a distance between the first feature vector and each feature vector of the set of feature vectors; determining, based on each distance, that the structured data records are classified as being similar to a respective document comprising the respective unstructured data; and selecting the set of structured data records as the structured data records to be augmented.

A7. The method of any one of embodiments A1-A6, wherein extracting the features comprises: applying a gazetteer to tag words or phrases in the unstructured data that include the features for extraction.

A8. The method of embodiment A7, further comprising: performing multi-stage pattern matching on the tagged words or phrases based on a set of rules for extracting the features.

A9. The method of embodiment A8, wherein the set of rules comprises a design attribute rule set, a design interventions rule set, or a participant rule set.

A10. The method of any one of embodiments A1-A9, wherein classifying the identified sentences comprises: applying a lexical model that assigns the polarity score and the strength score based on one or more lexical categories that include words that indicate polarity or strength.

A11. The method of any one of embodiments A1-A10, wherein classifying the identified sentences comprises: identifying an event, from among a plurality of events, in the identified sentences, each event relating to a subtopic within the domain of interest to be individually made searchable in the knowledge database; and collecting linguistic evidence at a sentence level relating to the event, wherein the NLP sentiment analysis model is applied to the collected linguistic evidence, wherein the polarity score and the strength score each relate to sentence-level scores.

A12. The method of any one of embodiments A1-A11, wherein the identified sentences are grouped into a paragraph, and wherein classifying the identified sentences comprises: identifying an event, from among a plurality of events, in the paragraph, each event relating to a subtopic within the domain of interest to be individually made searchable in the knowledge database; and collecting linguistic evidence at a paragraph level relating to the event, wherein the NLP sentiment analysis model is applied to the collected linguistic evidence, wherein the polarity score and the strength score each relate to paragraph-level scores.

A13. The method of any one of embodiments A1-A12, wherein classifying the identified sentences comprises: identifying an event, from among a plurality of events, in the identified sentences, each event relating to a subtopic within the domain of interest to be individually made searchable in the knowledge database; collecting linguistic evidence at a sentence level relating to the event, wherein the NLP sentiment analysis model is applied to the collected linguistic evidence, wherein the polarity score and the strength score each relate to sentence-level scores; determining that the collected linguistic evidence at the sentence level is insufficient for the NLP sentiment analysis model; responsive to determining that the collected linguistic evidence at the sentence level is insufficient: grouping the identified sentences into a paragraph; identifying the event in the paragraph; and collecting linguistic evidence at a paragraph level relating to the event, wherein the NLP sentiment analysis model is applied to the collected linguistic evidence, wherein the polarity score and the strength score each relate to paragraph-level scores.

A14. The method of any one of embodiments A1-A13, further comprising: extracting an indication of change from the unstructured data, the change history comprising a change in a value over time reported in the unstructured data; and including the indication of change in the knowledge database.

B1. A method, comprising: obtained a first document and a second document, the first document comprising structured data and the second document comprising unstructured data; extracting features from the unstructured data based on a natural language processing (NLP) model; generating a third document comprising the structured data augmented with the extracted features; and generating or updating a knowledge database to store the third document.

B2. The method of embodiment B1, wherein the first document comprises a structured data record and the second document comprises a document having unstructured data.

B3. The method of any one of embodiments B1-B2, wherein the third document comprises a data structure configured to store the structured data augmented with the extracted features.

B4. The method of any one of embodiments B1-B3, wherein the first document is stored in a first database configured to store documents comprising structured data, and the second document is stored in a second database configured to store documents comprising unstructured data.

B5. The method of any one of embodiments B1-B4, wherein the second document is a published technical article.

B6. The method of embodiment B5, wherein the published technical article comprises at least one of prose, graphs, images, tables, or diagrams.

B7. The method of embodiment B5, wherein the second document is derived from multimedia content comprises at least one of video, images, or audio, and wherein prose is extracted from the multimedia content.

B8. The method of any one of embodiments B1-B7, wherein the knowledge database stored a plurality of data structures indexed by an identifier associated with a clinical trial.

B9. The method of embodiment B8, wherein the identifier associated with the clinical trial is determined by extracting the identifier from a corresponding structured data record.

B10. The method of any one of embodiments B1-B9, wherein the first document comprises a structured data record comprising the structured data, wherein a structured data record includes one or more data fields describing a feature of a respective domain of interests in a predefined manner.

B11. The method of any one of embodiments B1-B10, wherein the domain of interest a domain of interest may include a clinical trial or a category of a clinical trial.

B12. The method of embodiment B11, wherein a clinical trial comprises scientific studies to determine an efficacy and safety of a particular therapeutic to treat a health condition.

B13. The method of any one of embodiments B1-B12, further comprising: matching the first document and the second document based on a determination that the first document and the second document have a common domain of interest.

B14. The method of any one of embodiments B1-B13, wherein the NLP model is configured to tokenize the unstructured data and used domain-specific entity identification of the tokenized unstructured data.

B15. The method of any one of embodiments B1-B14, further comprising: identifying sentences in the unstructured data that relate to a target aspect of a domain of interest.

B16. The method of embodiment B15, wherein the sentences are identified based on a similarity model that compares similarity between sentences.

B17. The method of embodiment B16, wherein the similarity model comprises an NLP similarity recognition model configured to compute a similarity score indicating how similar two sentences are to one another.

B18. The method of embodiment B17, wherein the similarity score comprises a cosine similarity in a feature space, wherein the similarity score is determined based on regularities in language used for the target aspect and uses the regularities to predict that an input sentence is similar to a sentence previously known to relate to the target aspect and a ranking of sentence similarity using latent semantic indexing.

B19. The method of embodiment B15-B18, further comprising: classifying the identified sentences into a sentiment classification based on an NLP sentiment analysis model, the sentiment classification including a polarity score and a strength score.

B20. The method of any one of embodiments B1-B19, wherein generating the third document comprises generating a data structure, wherein the data structure is stored in the knowledge database.

B21. The method of embodiment B20, wherein the data structure corresponds to the sentence, and the data structure has fields structuring data that represents (a) a target aspect in a domain of interest of the first document, (b) derived evidence measures that include (i) a polarity score, (ii) a strength score, and (c) some or all of the structured data or the structured data augmented with the extracted features.

C1. A non-transitory computer-readable medium storing computer program instructions that, when executed by one or more processors, effectuates operations comprising the method of any one of embodiments A1-A15 or B1-B21.

C2. A system, comprising: memory storing computer program instructions; and one or more processors configured to execute the computer program instructions to effectuate operations comprising the method of any one of embodiments A1-A15 or B1-B21.

This written description uses examples to disclose the embodiments, including the best mode, and to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of aligning structured data with unstructured data that is processed through natural language processing models to generate an aggregate knowledge database, the method comprising:

accessing a structured data record and a document having unstructured data, the structured data record having one or more data fields that describe a feature of a respective domain of interest in a predefined manner;

matching the structured data record and the document based on a common domain of interest;

extracting features from the unstructured data based on a natural language processing (NLP) entity extraction model that tokenizes the unstructured data and uses domain-specific entity identification of the tokenized unstructured data;

augmenting the structured data record with the extracted features to build aggregate knowledge across structured and unstructured data for the respective domain of interest;

identifying sentences in the unstructured data that relate to a target aspect of the domain of interest based on an NLP similarity recognition model that compares similarity between sentences using a cosine similarity in a vector space, wherein the similarity is based on regularities in language used for the target aspect and uses the regularities to predict that an input sentence is similar to a sentence previously known to relate to the target aspect and a ranking of sentence similarity using latent semantic indexing;

classifying the identified sentences into a sentiment classification based on an NLP sentiment analysis model, the sentiment classification including a polarity score and a strength score;

generating a data structure in a knowledge database that corresponds to the sentence, the data structure having fields structuring data that represents (a) the target aspect in the respective domain of interest, (b) derived evidence measures that include (i) the polarity score, (ii) the strength score, and (c) some or all of the structured data or augmented structured data;

generating, based on the ranking of sentence similarity, a graphical user interface for presentation on a client device, the graphical user interface comprising: (a) a ranked list of the identified sentences determined to relate to the target aspect of the domain of interest, the sentences being ordered according to the ranking of sentence similarity; and (b) for each of at least a subset of the ranked list, a displayed polarity score and a displayed strength score generated by the NLP sentiment analysis model; and causing display of the graphical user interface on the client device.

2. The method of claim 1, further comprising:

detecting, from the extracted features or metadata associated with the document, an occurrence of an identifier of the respective domain of interest within the unstructured data; and searching the knowledge database for data structures including the identifier of the respective domain of interest to obtain the structured data record.

3. The method of claim 2, wherein augmenting the structured data record relating to the respective domain of interest with the extracted features comprises:

updating the knowledge database with at least some of the extracted features based on a determination that at least one data field of the structured data record is missing.

4. The method of claim 2, wherein augmenting the structured data record relating to the respective domain of interest comprises:

generating a new structured data record responsive to determining that a structured data record associated with a second domain of interest is absent from the knowledge database, wherein the new structured data record comprises data fields populated by values associated with one or more features extracted from one or more unstructured documents relating to another domain of interest.

5. The method of claim 1, wherein identifying the sentences comprises:

generating a first feature vector representing text included in a given sentence;

mapping the first feature vector to a coordinate location in a multidimensional feature space; and determining a group of feature vectors having a distance from the coordinate location that is less than a distance threshold, wherein the sentences that are identified comprise sentences whose feature vectors map to coordinate locations in the multidimensional feature space that is less than the distance threshold.

6. The method of claim 1, further comprising:

generating a first feature vector representing the extracted features;

generating, for the structured data record, a second feature vector representing each of the one or more data fields describing a respective feature of the respective domain of interest to obtain a set of feature vectors;

computing a distance between the first feature vector and each feature vector of the set of feature vectors;

determining, based on each distance, that the structured data record is classified as being similar to a respective document comprising the respective unstructured data; and selecting the structured data record as the structured data records to be augmented.

7. The method of claim 1, wherein extracting the features comprises:

applying a gazetteer to tag words or phrases in the unstructured data that include the features for extraction.

8. The method of claim 7, further comprising:

performing multi-stage pattern matching on the tagged words or phrases based on a set of rules for extracting the features.

9. The method of claim 8, wherein the set of rules comprises a design attribute rule set, a design interventions rule set, or a participant rule set.

10. The method of claim 1, wherein classifying the identified sentences comprises:

applying a lexical model that assigns the polarity score and the strength score based on one or more lexical categories that include words that indicate polarity or strength.

11. The method of claim 1, wherein classifying the identified sentences comprises:

identifying an event, from among a plurality of events, in the identified sentences, each event relating to a subtopic within the respective domain of interest to be individually made searchable in the knowledge database; and collecting linguistic evidence at a sentence level relating to the event, wherein the NLP sentiment analysis model is applied to the collected linguistic evidence, wherein the polarity score and the strength score each relate to sentence-level scores.

12. The method of claim 1, wherein the identified sentences are grouped into a paragraph, and wherein classifying the identified sentences comprises:

identifying an event, from among a plurality of events, in the paragraph, each event relating to a subtopic within the respective domain of interest to be individually made searchable in the knowledge database; and collecting linguistic evidence at a paragraph level relating to the event, wherein the NLP sentiment analysis model is applied to the collected linguistic evidence, wherein the polarity score and the strength score each relate to paragraph-level scores.

13. The method of claim 1, wherein classifying the identified sentences comprises:

identifying an event, from among a plurality of events, in the identified sentences, each event relating to a subtopic within the respective domain of interest to be individually made searchable in the knowledge database;

collecting linguistic evidence at a sentence level relating to the event, wherein the NLP sentiment analysis model is applied to the collected linguistic evidence, wherein the polarity score and the strength score each relate to sentence-level scores;

determining that the collected linguistic evidence at the sentence level is insufficient for the NLP sentiment analysis model; and responsive to determining that the collected linguistic evidence at the sentence level is insufficient:

grouping the identified sentences into a paragraph;

identifying the event in the paragraph; and collecting linguistic evidence at a paragraph level relating to the event, wherein the NLP sentiment analysis model is applied to the collected linguistic evidence, wherein the polarity score and the strength score each relate to paragraph-level scores.

14. The method of claim 1, further comprising:

extracting an indication of change from the unstructured data, the change comprising a change in a value over time reported in the unstructured data; and including the indication of change in the knowledge database.

15. A system for generating a knowledge database, comprising: a processor programmed to:

identify sentences in unstructured data that relate to a target aspect of a domain of interest based on an NLP similarity recognition model that compares similarity between sentences using a cosine similarity in a vector space, where such similarity is based on regularities in language used for the target aspect and uses the regularities to predict that an input sentence is similar to a sentence previously known to relate to the target aspect and rank similar sentences using latent semantic indexing;

classify, the identified sentences into a sentiment classification based on an NLP sentiment analysis model that generates a polarity score and a strength score;

generate a data structure in the knowledge database that corresponds to the sentence, the data structure having fields structuring data that represents (a) the target aspect in the domain of interest, and (b) derived evidence measures that include (i) the polarity score, (ii) the strength score, and (c) some or all of the structured data, wherein information retrieval from the data structure in the knowledge database is available via the target aspect, the derived evidence measures and/or some or all of the structured data;

generating, based on the ranking of sentence similarity, a graphical user interface for presentation on a client device, the graphical user interface comprising: (a) a ranked list of the identified sentences determined to relate to the target aspect of the domain of interest, the sentences being ordered according to the ranking of sentence similarity; and (b) for each of at least a subset of the ranked list, a displayed polarity score and a displayed strength score generated by the NLP sentiment analysis model; and causing display of the graphical user interface on the client device.

16. The system of claim 15, wherein the processor is further programed to:

generate a first feature vector representing the extracted features;

generate, for the structured data record, a second feature vector representing each of the one or more data fields describing a respective feature of the respective domain of interest to obtain a set of feature vectors;

compute a distance between the first feature vector and each feature vector of the set of feature vectors;

determine, based on each distance, that the structured data record is classified as being similar to a respective document comprising the respective unstructured data; and select the structured data record as the structured data records to be augmented.

17. The system of claim 15, wherein the identified sentences being classified comprises:

identifying an event, from among a plurality of events, in the identified sentences, each event relating to a subtopic within the respective domain of interest to be individually made searchable in the knowledge database;

collecting linguistic evidence at a sentence level relating to the event, wherein the NLP sentiment analysis model is applied to the collected linguistic evidence, wherein the polarity score and the strength score each relate to sentence-level scores;

determining that the collected linguistic evidence at the sentence level is insufficient for the NLP sentiment analysis model; and responsive to determining that the collected linguistic evidence at the sentence level is insufficient:

grouping the identified sentences into a paragraph;

identifying the event in the paragraph; and collecting linguistic evidence at a paragraph level relating to the event, wherein the NLP sentiment analysis model is applied to the collected linguistic evidence, wherein the polarity score and the strength score each relate to paragraph-level scores.

18. A non-transitory computer-readable medium storing computer program instructions that, when executed by one or more processors, effectuate operations comprising:

accessing a structured data record and a document having unstructured data, the structured data record having one or more data fields that describe a feature of a respective domain of interest in a predefined manner;

matching the structured data record and the document based on a common domain of interest;

extracting features from the unstructured data based on a natural language processing (NLP) entity extraction model that tokenizes the unstructured data and uses domain-specific entity identification of the tokenized unstructured data;

augmenting the structured data record with the extracted features to build aggregate knowledge across structured and unstructured data for the respective domain of interest;

identifying sentences in the unstructured data that relate to a target aspect of the domain of interest based on an NLP similarity recognition model that compares similarity between sentences using a cosine similarity in a vector space, wherein the similarity is based on regularities in language used for the target aspect and uses the regularities to predict that an input sentence is similar to a sentence previously known to relate to the target aspect and a ranking of sentence similarity using latent semantic indexing;

classifying the identified sentences into a sentiment classification based on an NLP sentiment analysis model, the sentiment classification including a polarity score and a strength score;

generating a data structure in a knowledge database that corresponds to the sentence, the data structure having fields structuring data that represents (a) the target aspect in the respective domain of interest, (b) derived evidence measures that include (i) the polarity score, (ii) the strength score, and (c) some or all of the structured data or augmented structured data;

generating, based on the ranking of sentence similarity, a graphical user interface for presentation on a client device, the graphical user interface comprising: (a) a ranked list of the identified sentences determined to relate to the target aspect of the domain of interest, the sentences being ordered according to the ranking of sentence similarity; and (b) for each of at least a subset of the ranked list, a displayed polarity score and a displayed strength score generated by the NLP sentiment analysis model; and causing display of the graphical user interface on the client device.

19. The method of claim 1, further comprising:

generating, based on the ranking of sentence similarity, a graphical user interface for presentation on a client device, the graphical user interface comprising: (a) a ranked list of the identified sentences determined to relate to the target aspect of the domain of interest, the sentences being ordered according to the ranking of sentence similarity; and (b) for each of at least a subset of the ranked list, a displayed polarity score and a displayed strength score generated by the NLP sentiment analysis model; and causing display of the graphical user interface on the client device.

20. The method of claim 19, wherein the graphical user interface further includes:

(a) structured clinical trial characteristics corresponding to the structured data record; and (b) a visual representation of the derived evidence measures, including at least one of a multi-dimensional comparison of polarity and strength metrics or a graphical distribution of detected events by event type.

* * * * *